US006374159B1

(12) United States Patent
Naruse et al.

(10) Patent No.: US 6,374,159 B1
(45) Date of Patent: Apr. 16, 2002

(54) VEHICLE WHEEL ALIGNMENT ADJUSTMENT METHOD

(75) Inventors: Yutaka Naruse, Tokyo; Yozo Hattori, Aichi-ken, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/379,513

(22) Filed: Aug. 23, 1999

(30) Foreign Application Priority Data

Aug. 21, 1998 (JP) .......................................... 10-235988

(51) Int. Cl.⁷ ................................................ G01M 1/38
(52) U.S. Cl. ................ 700/279; 33/203.15; 356/139.09
(58) Field of Search ........................... 700/279, 57, 58; 356/138, 139, 139.09; 33/203.12–203.21

(56) References Cited

U.S. PATENT DOCUMENTS

| 4,158,961 A | * | 6/1979 | Ben-David ................... 73/117 |
| 4,450,529 A | * | 5/1984 | Hill et al. .................... 700/279 |
| 4,835,714 A | * | 5/1989 | Sano et al. .................. 700/279 |
| 4,931,964 A | * | 6/1990 | Titsworth et al. ........... 700/279 |
| 5,105,547 A | * | 4/1992 | Fujii ........................ 33/203.13 |
| 5,488,472 A | * | 1/1996 | January ................... 356/139.09 |
| 5,513,438 A | * | 5/1996 | Emmons .................. 33/203.12 |
| 5,875,418 A | * | 2/1999 | Gill et al. .................... 702/150 |
| 5,930,881 A | * | 8/1999 | Naruse et al. ............. 29/407.08 |
| 6,209,209 B1 | * | 4/2001 | Linson et al. ............. 33/203.12 |

FOREIGN PATENT DOCUMENTS

| JP | 51-18681 | 6/1976 |
| JP | 7-5076 | 1/1995 |
| JP | 8-334440 | 12/1996 |
| JP | 10-7013 | 1/1998 |

* cited by examiner

*Primary Examiner*—William Grant
*Assistant Examiner*—Zoila Cabrera
(74) *Attorney, Agent, or Firm*—Sughrue Mion, PLLC

(57) ABSTRACT

A wheel angle of a wheel is adjusted in accordance with the characteristics of tire of the wheel such that a steering characteristics of the vehicle is substantially neutral steer. The wheel angle of a reference wheel of the vehicle (for example, a rear wheel) is adjusted. Next, the reference wheel and a non-reference wheel (for example, a front wheel) are rotated on the tire driving surface of an endless track on which are formed a plurality of plate-like protrusions of a predetermined height. The longitudinal and lateral forces generated in the tire are then measured. On the basis of the wave forms of the rate of change measured in the longitudinal force, a predetermined period is determined from the time when the tire is deformed as the wheel passes over the upward step of the protrusion until the tire is deformed as the wheel passes over the downward step of the protrusion, and data of the lateral force measured within the predetermined period is extracted. The wave forms of the lateral forces of both wheels indicated by the extracted data are superposed, and the direction in which the toe angle of the non-reference wheel should be adjusted is calculated on the difference in the wave forms.

9 Claims, 18 Drawing Sheets

———: RATE OF CHANGE IN THE LATERAL FORCE
      (PRIMARY DIFFERENTIAL VALUE)

———: RATE OF CHANGE IN THE LONGITUDINAL FORCE
      (PRIMARY DIFFERENTIAL VALUE)

———: RATE OF CHANGE IN THE LATERAL FORCE
(PRIMARY DIFFERENTIAL VALUE)

———: RATE OF CHANGE IN THE LONGITUDINAL FORCE
(PRIMARY DIFFERENTIAL VALUE)

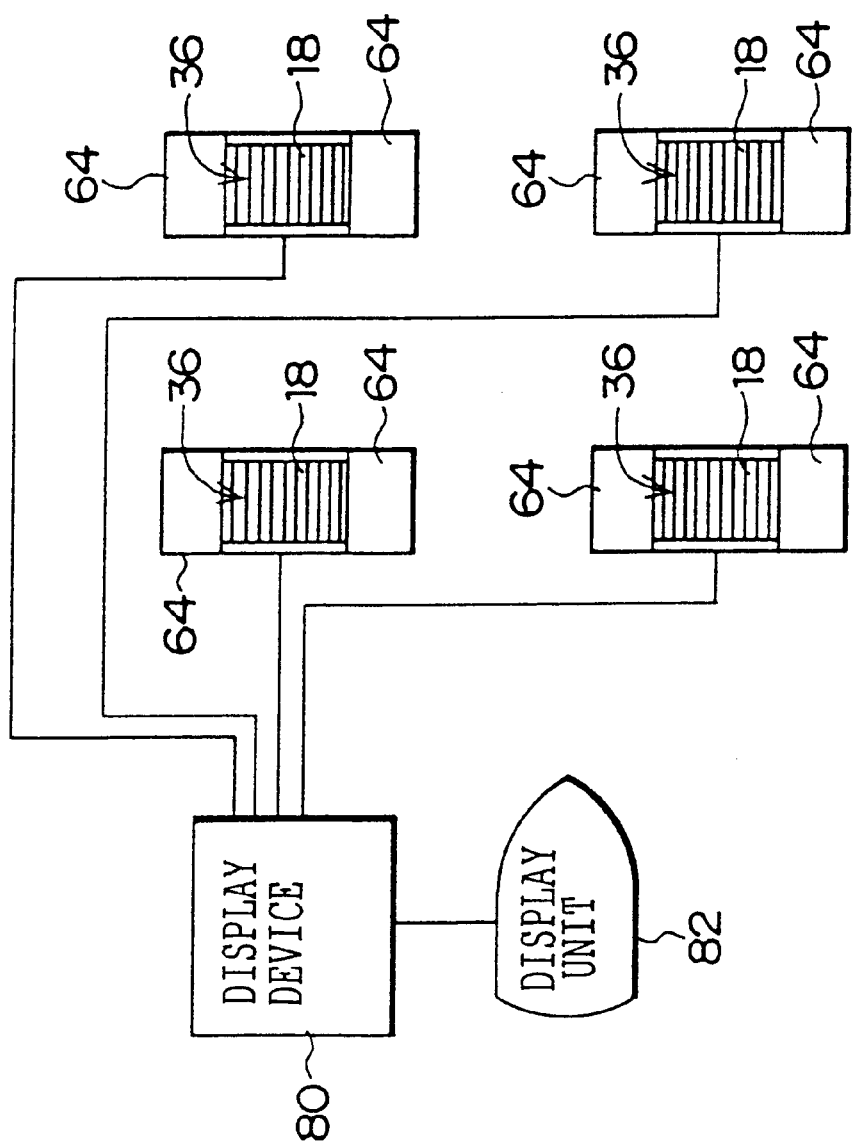
F I G. 5

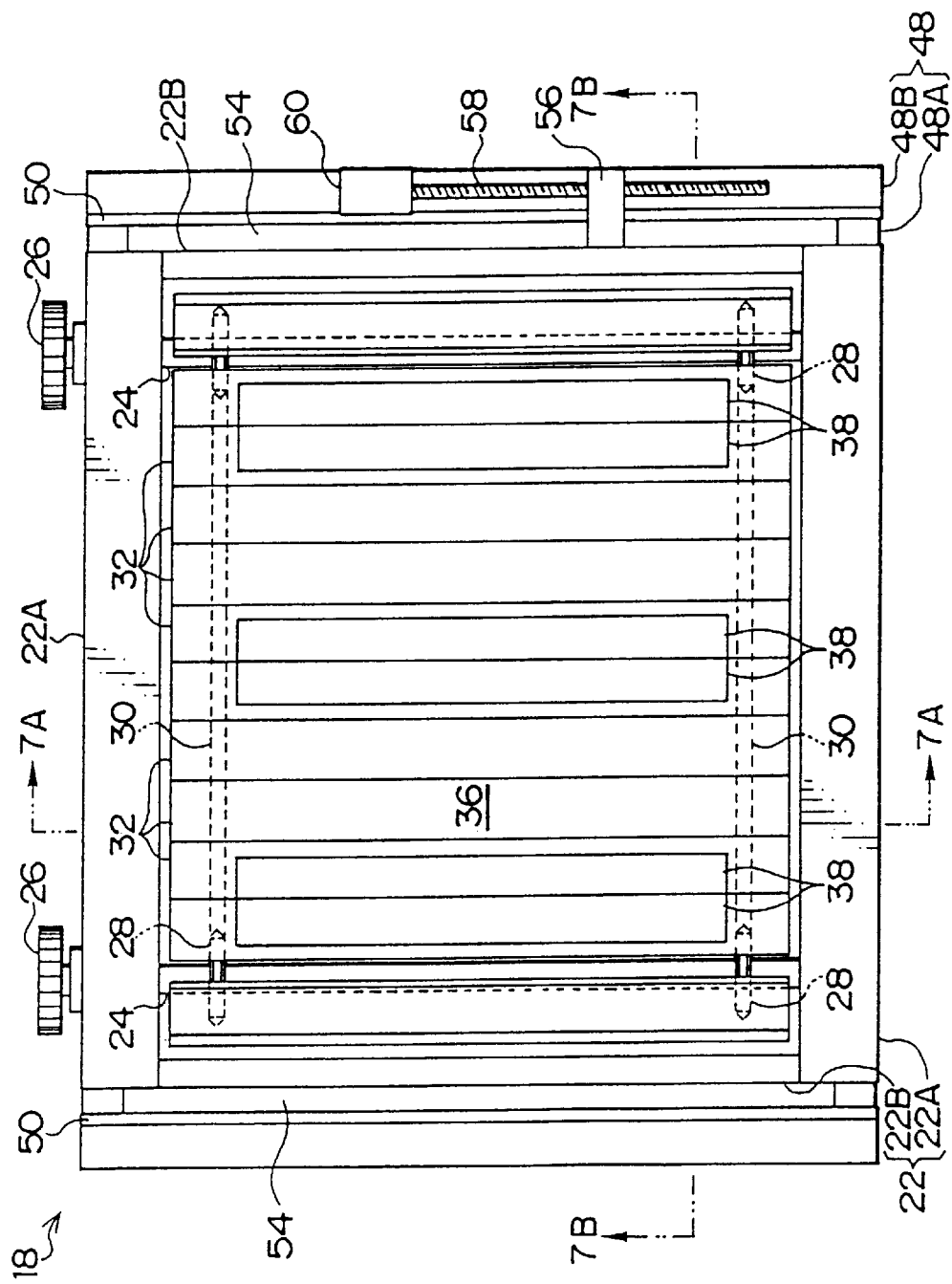

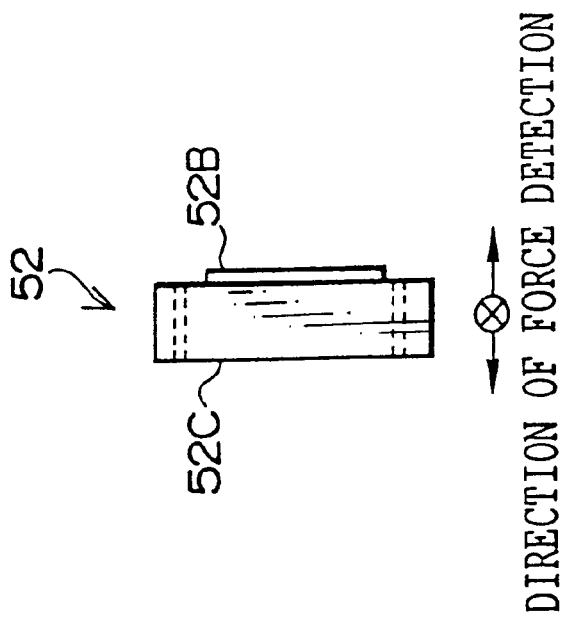
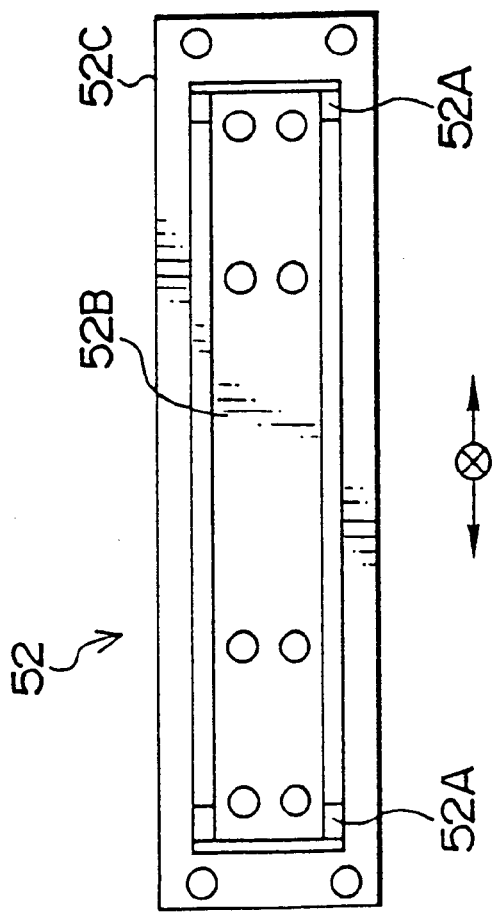

TRANSITION OF RATE OF CHANGE IN LONGITUDINAL FORCE (dFx/dt) AND LATERAL FORCE Fy OF REFERENCE WHEEL

TRANSITION OF RATE OF CHANGE IN LONGITUDINAL FORCE (dFx/dt) AND LATERAL FORCE Fy OF NON-REFERENCE WHEEL

COMPARISON OF TRANSITIONS OF LATERAL FORCES Fy OF NON-REFERENCE WHEEL AND REFERENCE WHEEL

VEHICLE WHEEL ALIGNMENT ADJUSTMENT METHOD

BACKGROUND OF THE INVENTION

1. Field of the Invention

The present invention relates to a method for adjusting the wheel alignment of a vehicle, and particularly to a method for adjusting a wheel angle of a vehicle in which a wheel of a vehicle with a tire fitted thereto is rotated on a wheel rotating surface, the tire is deformed, and the forces thereby generated are measured, the wheel angle is then adjusted on the basis of the results of the measurement providing an improvement in the running stability of the vehicle and a reduction in the wear of only one side of the tire.

2. Description of the Related Art

In general, wheels are provided with a camber angle which ensures the running stability of the vehicle and are also provided with a toe angle for preventing wear on only one side of the tire caused by the camber angle (in the present specification, the term "one-sided wear" is used hereafter to describe a state where, upon observation of the state of wear of a worn tire, it can be seen that the amount of wear extending from one tread shoulder portion to the other tread shoulder portion changes in a tapered fashion, i.e. a state where one tread shoulder portion is more worn than the central portion of the tread and the other tread shoulder portion).

Conversely, the wheel may be provided with a toe angle for balancing the forces generated at the front tires and at the rear tires thereby ensuring the running stability of the vehicle and may be provided with a camber angle to prevent one-sided wear caused by the toe angle. Alternatively, the toe angle and camber angle may both be adjusted in combination to optimize the running stability of the vehicle and minimize the one-sided wear of the tire under the restraints imposed by the vehicle such as the structural dimensions thereof and the like.

Accordingly, in order to improve the running stability of the vehicle and resistance of the tire to one-sided wear during driving, it is necessary to adjust the toe angle and camber angle, which are the wheel angles (positional angles) provided to each wheel. In the conventional method of adjusting the toe and camber angle, generally, the angle and dimensions of each wheel are measured and the measured toe and camber angles are then adjusted so as to match the target values set when the vehicle was designed.

However, while tires have various characteristics such as ply steer, which is caused by the internal construction of the tire; toe force, which is generated because the tire is at an angle to the direction in which the vehicle is advancing caused by the fact that the direction in which the wheel is rotating is different to the direction in which the vehicle is advancing; self-aligning torque, which is generated because the direction of advancement does not match the point on the road-contacting surface to which the force is applied; camber thrust, which is generated when the tire deforms due to the camber angle of the wheel depending on the rigidity of the tire governed by the internal structure of the tire; camber moment, which is generated by the difference between the left and right sides of the road-contacting surface; conicity, which arises from manufacturing errors inherent in industrial products; and rolling resistance, which differs depending on the internal structure and the material used such as the rubber, these characteristics depend on and vary in accordance with the load applied to the wheel. Further, these characteristics also depend on the type of tire.

In other words, the above-mentioned forces are generated by the deformation of the tire. The force generated by the tire to control its running direction while causing the vehicle to advance is the sum of the above-mentioned forces. Therefore, regardless of the type of tire, this force differs depending on the load distribution of the vehicle to which the tire is fitted and the alignment of the wheel (wheel angle). Accordingly, to meet the demands for increased vehicle speed and better directional stability, a wheel alignment adjustment method is necessary which provides better running stability and one-sided wear resistance.

The technology disclosed in Japanese Patent Application Publication (JP-B) No. 51-18681 is known as a conventional adjustment method focussing on the characteristics of the tire. The wheel is driven using a plurality of rollers and each of the forces generated by the rollers is measured. The toe angle and camber angle are then measured on the basis of the direction and magnitude of the measured force. However, it has been verified that the force generated by the contact between the tire and the road differs depending on the configuration of the contact between the tire and the road surface. Because of this, the configuration of the contact between the tire and a roller are is very different from the configuration of the contact between the tire and the actual road surface. Therefore, the characteristics of the force generated differ greatly between the road surface and the roller.

More specifically, although the force generated using the roller resembles the lateral force caused by the ply steer and the provision of the toe angle when running on an actual road surface, the alignment and the size of the force are greatly different from those occurring when the wheel is run on an actual road surface. Moreover, the camber thrust is barely detectable. In addition, the forces generated in the tire arising from the deformation of the tire caused by external disturbances from the numberless bumps in the road surface cannot be detected.

Accordingly, In the above-described conventional art, the measured force exhibits values which are different from values obtained from an actual road surface. In order to correct the measured values to the values obtained from an actual road surface, data expressing the characteristics of the respective tires on an actual road surface is needed. Therefore the above-described conventional method lacks wide applicability in actual practice. Further, no technical information has been disclosed with regard to what angle the alignment should be adjusted to in order achieve the optimum alignment.

A technique is known in which a wheel is driven using a plurality of rollers which aims to achieve high running stability by bringing lateral forces to substantially zero (see Japanese Patent Application Laid-Open (JP-A) No. 7-5076). In this technique, a wheel which has a camber angle is given an alignment which generates a force in the opposite direction to the direction of the camber thrust in order to bring the generated lateral forces to zero.

However, even in this technique, in the same way as the previously described case, because the contact surface of the tire with the rollers is different from the contact surface of the tire with the actual road surface, the camber thrust is almost undetectable. Moreover, in order to offset the force generated by the rotation of the wheel so as to bring the lateral force to zero, it is necessary to apply the force from the road surface generated by the running of the vehicle in the opposite direction to the direction of the force generated by the vehicle. In this case, the deformation of the road-contacting surface of the tire becomes even greater than when the tire is in a stationary state, and this deformation of the road-contacting surface is a factor in the generation of one-sided wear of the tire.

A method has been proposed (see JP-A 8-334440) for adjusting the alignment of a wheel by rotating the wheel on a substantially planar surface using a belt or the like, detecting the force generated by the wheel and adjusting the alignment on the basis of that force. However, an actual road surface is formed with numberless bumps and hollows (protrusions and recesses) and a tire on a running vehicle is always deformed by these numberless bumps and hollows. The load applied to each wheel also varies when the vehicle is running over bumps and hollows of a comparatively long cycle also deforming each tire so that the tire on a running vehicle is rotating while being affected by the force generated by the contact of the tire with the road surface and the force from the above deformations. In contrast, the force which can be detected by rotating the tire on a planar surface formed from a belt or the like is only the force which is generated by the contact of the tire with the belt surface. There is additionally none of the load variation which is generated by an actual road surface with the result that only a portion of the forces generated by running on an actual road surface can be detected using the conventional method. Accordingly, even if the alignment of a wheel is adjusted on the basis of the forces detected in conditions which are unaffected by load variation such as those generated by a substantially planar surface, the running stability will be improved for a vehicle running on an extremely level surface, however, there will be no improvement in other running characteristics and in one-sided wear.

More specifically, when a tire is running on an actual road surface, forces are generated by different generating mechanisms. In spite of the fact that these forces differ depending on the characteristics of the tire, the following conventional methods have been used: (1) a vehicle is actually run using specific tires, the angle at which one-sided wear is the least without losing running stability is found empirically, and the wheel is adjusted to this angle; (2) the wheel is adjusted to angle where the force measured on a planar surface is offset to the minimum possible (substantially zero); (3) the wheel is adjusted to an angle where only the specific force measured by running the wheel on a planar surface or on rollers is the minimum possible (substantially zero); (4) the wheel is adjusted to an angle obtained through some other method. However, none of these methods can be applied to a variety of different vehicles running on a variety of different tires.

Moreover, the present inventors measured the lateral force and longitudinal force generated in a tire when the vehicle wheel travels over a step and proposed a method for adjusting the wheel angle of a vehicle in such a way that variation in the lateral force at the time the longitudinal force is at a maximum or substantially maximum value was at a minimum (see JP-A No. 10-7013). In this method, the longitudinal force is measured to detect the timing at which the deformation of the tire is at maximum and the period in which the longitudinal force is at maximum or substantially maximum is taken as the period in which the amount of tire deformation is at maximum or substantially maximum.

However, the timing at which the longitudinal force changes depends on the suspension geometry of the vehicle. The suspension geometry of the vehicle sometimes causes the timing at which the tire deformation is at maximum or substantially maximum to fail to match up with the timing at which the longitudinal force of the vehicle is at maximum or substantially maximum. Accordingly, the accuracy of the above-described adjustment method is affected by the suspension geometry of the vehicle and it is not always possible to adjust the alignment of the wheel to the optimum even if the above-described method is used.

Moreover, the vehicle's steering (steer) characteristics, which have a great effect on the running stability of the vehicle, are determined by a balance between the forces generated in the tire on each wheel of the vehicle, and as the above-described technologies are all concerned with adjusting the wheel angle of individual wheels of a vehicle one by one, they give no consideration at all to the balance while the vehicle is running.

Moreover, a method in which, the size of the lateral force generated in the front and rear tires when the tires are rotating are compared, then steering characteristics (over steer, under steer, or neutral steer) is obtained in accordance with the distribution of the lateral forces and changes in the distribution of the lateral forces, is known. However, because the lateral force is a force is generated on the tire rotating on a flat surface in accordance with the wheel angle and the load, then even if the forces generated in actual vehicle are actually measured, it is difficult to apply the results to the adjustment of an actual vehicle.

Accordingly, even if the above-described technologies are used for adjusting the individual wheel angle, the problem remains that it is not guaranteed that the optimum steer characteristics will be obtained.

SUMMARY OF THE INVENTION

The present invention was conceived in consideration of the above facts and it is an object thereof to obtain a method of adjusting the wheel alignment of a vehicle in which an wheel angle can be adjusted to an wheel angle which accords with the characteristics of the tire such that the steer characteristics of the vehicle becomes substantially neutral.

The object of the present invention is thus to provide a method of adjusting the wheel alignment of a vehicle which enables the wheel angle to be simply adjusted to an wheel angle which accords with the characteristics of the tire and provides a running stability appropriate for an actual road surface, and at the same time reduces one-side wear and optimizes the running characteristics so that the steering characteristics are substantially those of neutral steer, without being affected by the suspension geometry of the vehicle.

When a tire is rotated by contact with an uneven road surface (a road surface having protrusions and recesses), the tire is deformed by load variations generated as the tire moves vertically relative to the ground-contacting surface of the tire and the lateral forces (specifically, the lateral force known as ply steer caused by the structure of the tire, the lateral force known as conicity caused by the manufacturing process, the lateral force due to the imparting of a slip angle (toe angle) to the wheel, and the lateral force known as camber thrust due to the imparting of a camber angle to the wheel) generated on the tire, by the deformation, all vary. In the technology disclosed in JP-A No. 10-7013, as was explained above, the angle of the wheel is adjusted on the basis of the variation in the lateral force generated in the tire when the deformation of the tire is at maximum or substantially maximum as the wheel travels over a step simulating an actual road surface (the variation in the load is occurred at the passage of the wheel over this step).

However, because the lateral force generated in the tire varies because of the deformation of the tire as the load changes or as the tire passes over step, as was explained above, then as the factors causing these deformations in the tire disappear, the tire, which had been in a deformed state, attempts to deform back to its normal shape and this deformation also causes the lateral force to vary. The present inventors, realized from the above facts, come to the conclusion that by observing the variation in the lateral force during a period including not only the time during which the deformation of the tire is at maximum or substantially maximum, but also the time during which the tire attempts to deform back to its normal state, and by adjusting the wheel alignment (adjusting the angle of the wheel) so that the energy of the variation in the lateral force over the above-described period is at a minimum, a higher degree of running stability suitable for an actual road surface and a further reduction in one-sided wear could be achieved.

In order to verify the above discovery, the present inventors performed the experiment described below. Specifically, a tire was rotated using a tire driving apparatus having, in at least one position on the tire-driving surface thereof in the direction in which the tire driving apparatus is driven to rotate, a planar protrusion whose length in the direction of rotation is long enough for the tire to sit completely thereon and whose length in the axial direction of the rotation which is orthogonal to the direction of rotation is larger than the width of the tire. (By this structure, a step is formed at the front and the rear of the planar protrusion along the direction of the rotation on the tire-driving surface.) The lateral force generated in the tire is measured repeatedly in short cycles. Then from the results of the measurement of the lateral force during each cycle (each measurement time) which is within a predetermined period which includes the time from the moment the tire is deformed as the wheel passes over the step until the tire rotates and substantially returns to its normal state, the sum of the square root of the rate of change (the value of the primary differential for the time of the lateral force) in the lateral force, as the energy of the variation in the lateral force within the above predetermined period, in each measurement time is repeatedly obtained while the alignment (in this experiment, the toe angle) of the wheel is altered each time by a predetermined amount.

FIG. 1 shows the relationship obtained by the above experiment between the toe angle and the energy of the variation in the lateral force generated in the tire within the predetermined period. As is clear from FIG. 1, the above experiment confirmed that a definite correlation exists between the toe angle and the energy of the variation in the lateral force. Confirmation was also made that when the toe angle of the vehicle was adjusted so that the energy of the variation in the lateral force was at the minimum, the running stability of the vehicle was improved greatly and one-sided wear was greatly reduced.

The present inventors also compared and evaluated the running stability of several different models of vehicle (vehicles 1 to 4) under two types of adjustment mode. One mode was with the wheel angle adjusted to the angle determined when the vehicle was designed (standard mode); the second mode, as in the experiment described above, was with the wheel angle adjusted so that the energy of the variation in the lateral force generated in the tire during a predetermined period including the time from when the tire is deformed by the wheel travelling over a step until the tire rotates and returns substantially to its normal state was at minimum (the present mode). The vehicles used as vehicles 1 to 4 all had a displacement of between 1600 cc and 3000 cc and had either an FF or FR drive system (i.e. passenger vehicles). The tires used were all models sold on the general market of a size appropriate to the vehicle to which they were fitted. The results of the experiment are shown in Table 1. The standards by which the results were evaluated are shown in Table 2.

TABLE 1

| Evaluated Vehicle | Straight Line Progression (Flat Road) | Straight Line Progression (Undulating Road | Wandering | Cornering Stability | Riding Comfort on Rough Surfaces | One-sided Wear |
|---|---|---|---|---|---|---|
| Vehicle 1 | | | | | | |
| Present Mode | 9.0 | 8.5 | 8.0 | 8.0 | 7.0 | 98 |
| Standard Mode | 8.5 | 7.0 | 6.5 | 6.5 | 6.5 | 80 |
| Vehicle 2 | | | | | | |
| Present Mode | 8.5 | 8.5 | 8.0 | 7.5 | 8.0 | 98 |
| Standard Mode | 6.0 | 6.5 | 6.5 | 6.5 | 6.5 | 60 |
| Vehicle 3 | | | | | | |
| Present Mode | 8.0 | 8.0 | 8.0 | 8.5 | 6.5 | 97 |
| Standard Mode | 6.5 | 7.0 | 6.5 | 6.5 | 5.5 | 79 |
| Vehicle 4 | | | | | | |
| Present Mode | 9.0 | 8.5 | 8.5 | 7.5 | 7.5 | 99 |
| Standard Mode | 8.0 | 7.5 | 8.0 | 7.5 | 6.5 | 85 |

As is clear from Table 1, the above experiment verified that, by adjusting the wheel alignment so that the energy of the variation in the lateral force generated in the tire during a predetermined period including the time from when the tire is deformed by the wheel travelling over a step until the tire rotates and returns substantially to its normal state is at a minimum, then regardless of the type of tire, the running stability of the vehicle can be greatly improved, and one-sided wear can also be greatly reduced. Moreover, even when the tire is deformed due to the load acting on the tire changing, the lateral force generated in the tire by the deformation of the tire shows the same change as when the tire is deformed by the wheel travelling over a step.

TABLE 2

| Evaluation Level | | |
|---|---|---|
| | 6 | Barely acceptable |
| | 7 | Somewhat Acceptable |
| | 8 | Acceptable |
| | 9 | Very Acceptable |

TABLE 2-continued

| | | |
|---|---|---|
| Level of Difference in Evaluated Point | ±0.5 | Slight Difference |
| | ±1.0 | Difference |
| | 2 | Substantial Difference |
| Evaluation of One-sided Wear | One-sided Wear Ratio = Shoulder Wear/Center Wear × 100 (The larger of the one-sided wear ratios of each wheel is taken and the average value of all four wheels of each vehicle is shown in the evaluation table) | |

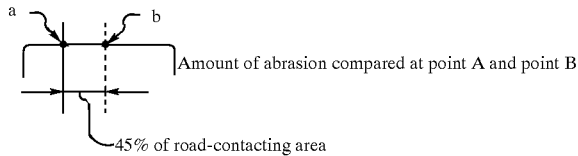

Accordingly, the present inventors realized, in the above experiment, by: rotating a wheel having a tire fitted thereto on a wheel rotating surface in a proceeding direction of the vehicle, measuring at least the lateral force generated in the tire when the tire is deformed either by the wheel on which the tire is fitted travelling over a step formed on the wheel rotating surface or by the load acting on the wheel being changed; determining (obtaining) the energy of the variation in the lateral force generated in the tire within a predetermined period, determining the optimum wheel angle in accordance with the characteristics of the tire on the basis of the above-determined energy of the variation in the lateral force; and adjusting the wheel angle to the above-determined optimum wheel angle, to obtain a running stability suitable for an actual road surface and achieve a reduction in one-sided wear.

The present inventors also realized that, because the steering (steer) characteristics of a vehicle are basically determined by the balance of the forces generated in the front and rear tires of a vehicle, if the wheel angle is adjusted so that the way in which the lateral force (or the rate of change in the lateral force: the primary differential value of the lateral force) changes, within a predetermined period when the front wheel of a vehicle travel over a step or a predetermined period when the load acting on the front wheel is changed, is made to resemble the way in which the lateral force (or the rate of change in the lateral force) changes, within a predetermined period when the rear wheel of a vehicle travel over a step or a predetermined period when the load acting on the rear wheel is changed, i.e. if the differences between the two (the front and the rear) changes are decreased, then the possibility exists that the steering characteristics of the vehicle can be adjusted to substantially a neutral state.

More specifically, in the afore-mentioned experiment, the present mode was set as being the mode in which: the rear axle is determined as the reference axle and the front axle is determined as the non-reference axle, when the wheel angle was adjusted so that, after the wheel angle for the reference axle (the rear wheels) was adjusted so that the energy of the variation in the lateral force generated in the tire within a predetermined period which included the time from when the tire was deformed as the wheel traveled over the step until the tire rotated and returned to substantially its normal state was at a minimum, the transition of the lateral force (or rate of change in the lateral force) generated within a predetermined period, which included the time from when the tire was deformed as the wheel traveled over the step until the tire rotated and returned to substantially its normal state, in the wheel of the non-reference axle was similar (i.e. the difference was decreased) to the transition of the reference wheel mounted diagonally opposite each non-reference wheel (i.e. for the right front wheel, the left rear wheel is the diagonally opposite reference wheel, while for the left front wheel, the right rear wheel is the diagonally opposite reference wheel).

Therefore, the present inventors further carried out the experiment described below. Namely, the present inventors used the same vehicles (vehicles 1~4) and the same tires as in the afore-mentioned experiment, and adjusted the wheel angle of the rear wheel of the reference axle (with the rear axle determined as the reference axle and the front axle determined as the non-reference axle) in the same way as in the afore-mentioned experiment. Then, when adjusting the wheel angle of the front wheel of the non-reference axle (the front wheels), the wheel, mounted on the same side of the vehicle in the transverse direction thereof, of the non-reference axle was taken as the reference wheel (i.e. the right rear wheel was set as the reference wheel for the right front wheel, while the left rear wheel was set as the reference wheel for the left front wheel), and the wheel angle of the wheel of the non-reference axle (the front wheel) was then adjusted in the same way as in the afore-mentioned experiment (the present mode in the Table 3). Experiments were then conducted to compare and evaluate the running stability in this mode with the running stability when the wheel angle of the front wheel and rear wheel of the vehicle were adjusted to the angle determined when the vehicle was designed (the standard mode). The results of the experiment are shown in Table 3. Note that the reference values shown in FIG. 2 are also used for the evaluation value settings in FIG. 3.

TABLE 3

| Evaluated Vehicle | Straight Line Progression (Flat Road) | Straight Line Progression (Undulating Road | Wandering | Cornering Stability | Riding Comfort on Rough Surfaces | One-sided Wear |
|---|---|---|---|---|---|---|
| Vehicle 1 | | | | | | |
| Present Mode | 8.5 | 7.0 | 7.0 | 8.5 | 6.0 | 81 |
| Standard Mode | 8.5 | 7.0 | 6.5 | 6.5 | 6.5 | 80 |
| Vehicle 2 | | | | | | |
| Present Mode | 6.5 | 6.5 | 7.0 | 8.0 | 7.0 | 76 |
| Standard Mode | 6.0 | 6.5 | 6.5 | 6.5 | 6.5 | 60 |

TABLE 3-continued

| Evaluated Vehicle | Straight Line Progression (Flat Road) | Straight Line Progression (Undulating Road) | Wandering | Cornering Stability | Riding Comfort on Rough Surfaces | One-sided Wear |
|---|---|---|---|---|---|---|
| Vehicle 3 | | | | | | |
| Present Mode | 7.0 | 7.0 | 6.5 | 8.5 | 5.5 | 80 |
| Standard Mode | 6.5 | 7.0 | 6.5 | 6.5 | 5.5 | 79 |
| Vehicle 4 | | | | | | |
| Present Mode | 8.5 | 7.5 | 8.0 | 9.0 | 7.0 | 85 |
| Standard Mode | 8.0 | 7.5 | 8.0 | 7.5 | 6.5 | 85 |

As is clear from Tables 1 and 3, on the basis of the results of the above experiments, the present inventors discovered that, if one axle of a plurality of axles of a vehicle (either the front axle or rear axle) is determined to be the reference axle, then if the wheel angle of a wheel mounted on the other axle (non-reference axle) is adjusted so that the transition of the lateral force (or the rate of change in the lateral force) generated in the tire of the wheel (the non-reference wheel) mounted to the other axle (either the front axle or the rear axle) rotating in contact with the road when the tire travels over the step, or when the load acting on the wheel is changed, is similar (the difference is decreased) to the transition of the lateral force (or the rate of change in the lateral force) generated in the tire of the wheel (the reference wheel) mounted to the reference axle (either the front axle or the rear axle) rotating in contact with the road when the tire travels over a step, or when the load acting on the wheel is changed, the result is that, regardless of the type of tire, the steering characteristics of the vehicle can be adjusted to substantially those of neutral steering.

On the basis of the above, in the vehicle wheel alignment adjustment method according to the first aspect of the present invention, a process in which a wheel of the vehicle to be adjusted with a tire fitted thereto is rotated on a wheel rotating surface in a proceeding direction of the vehicle, one of that the wheel passes over a step of a predetermined height formed on the wheel rotating surface or that a (vertical) load acting on the wheel is changed by a predetermined amount within a predetermined period, and a lateral force generated in the tire fitted to the wheel is measured, is performed for a reference wheel having the tire fitted thereto which is mounted on a reference axle of the vehicle, and for a wheel having a tire fitted thereto to be adjusted which is mounted on a non-reference axle of the vehicle, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted, and a wheel-angle of the wheel to be adjusted is adjusted on the basis of the results of the comparison.

According to the first aspect of the present invention, a process in which a wheel of the vehicle to be adjusted with a tire fitted thereto is rotated on a wheel rotating surface in a proceeding direction of the vehicle, one of that the wheel passes over a step of a predetermined height formed on the wheel rotating surface or that a load acting on the wheel is changed by a predetermined amount within a predetermined period, and a lateral force generated in the tire fitted to the wheel is measured, is performed for a reference wheel having the tire fitted thereto which is mounted on a reference axle of the vehicle, and for a wheel having a tire fitted thereto to be adjusted which is mounted on a non-reference axle of the vehicle. Note that, in the present invention, lateral force means the force running in the direction of a line intersecting a plane which includes the axis orthogonal to the proceeding direction (the direction of the relative movement between the vehicle and the wheel rotating surface) of the vehicle and the wheel rotating surface (the road surface). Changing the load acting on the vehicle can be achieved by rotating the wheel on a substantially planar wheel rotating surface and displacing the wheel in a vertical direction via the wheel rotating surface.

Further, in the first aspect of the present invention, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted, and a wheel angle of the wheel to be adjusted is adjusted on the basis of the results of the comparison. Accordingly, the transition of the lateral force or of the rate of change in the lateral force generated in the tire fitted to the wheel to be adjusted can be brought near to the transition of the lateral force or of the rate of change in the lateral force generated in the tire fitted to the reference wheel. Therefore, as is clear also from the results of the experiment described above, the wheel angle can be adjusted to an wheel angle in accordance with the characteristics of the tire so as to make the steering characteristics of the vehicle substantially the characteristics of neutral steer.

It is preferable that the period for comparing the transitions of the lateral force or of the rates of change in the lateral force is the period which includes the time from when the tire deforms as the wheel travels over the step or as the load acting on the wheel is changed until the tire rotates and returns substantially to its normal state. This period can be determined by, for example, detecting the start of the period by detecting the displacement of the wheel and then detecting the end of the period by measuring a certain passage of time since the start of the period. However, in this case, a complicated mechanism is necessary to determine the period for comparing the transitions of the lateral force or of the rates of change in the lateral force and errors may occur in determining the period.

For this reason, in the vehicle wheel alignment adjustment method according to the second aspect of the present invention, a process in which a wheel of the vehicle to be adjusted with a tire fitted thereto is rotated on a wheel rotating surface in a proceeding direction of the vehicle, one of that the wheel passes over a step of a predetermined height formed on the wheel rotating surface or that a load acting on the wheel is changed by a predetermined amount within a predetermined period, and one of a longitudinal force or a (vertical) load, and a lateral force generated in the tire fitted to the wheel are each measured, is performed for a reference wheel having the tire fitted thereto which is mounted on a reference axle of the vehicle, and for a wheel having a tire fitted thereto to be adjusted which is mounted on a non-reference axle of the vehicle, a predetermined period including a time from when the tire of the wheel is deformed at one of the wheel passing over a step or the load acting on the wheel being changed until the tire rotates and returns substantially to normal state is determined for the reference wheel and for the wheel to be adjusted on the basis of the results of the measurement of one of the longitudinal force or the load, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted within the predetermined period, and a wheel angle of the wheel to be adjusted is adjusted on the basis of the results of the comparison.

In the second aspect of the present invention, a process in which a wheel of the vehicle to be adjusted with a tire fitted thereto is rotated on a wheel rotating surface in a proceeding direction of the vehicle, one of that the wheel passes over a step of a predetermined height formed on the wheel rotating surface or that a load acting on the wheel is changed by a predetermined amount within a predetermined period, and one of a longitudinal force or a load, and a lateral force generated in the tire fitted to the wheel are each measured, is performed for a reference wheel having the tire fitted thereto which is mounted on a reference axle of the vehicle, and for a wheel having a tire fitted thereto to be adjusted which is mounted on a non-reference axle of the vehicle, a predetermined period including a time from when the tire of the wheel is deformed at one of the wheel passing over a step or the load acting on the wheel being changed until the tire rotates and returns substantially to normal state is determined for the reference wheel and for the wheel to be adjusted on the basis of the results of the measurement of one of the longitudinal force or the load. Note that the longitudinal force according to the present invention is the force in a direction running along a line intersecting a plane which includes the axis running in the direction in which the vehicle travels forward (the direction in which the vehicle moves relative to the wheel rotating surface) and the wheel rotating surface (the road surface), while the load according to the present invention is the force in a vertical direction applied to the wheel rotating surface (the road surface).

The longitudinal force and the load can both be easily measured by providing a sensor on the wheel rotating surface, a member connected to the wheel rotating surface, or on the wheel which is to be adjusted (in the same way as the lateral force). Moreover, provided that the vehicle is the same, the transition of the longitudinal force and the load generated in the tire (i.e. the waveform) as the wheel rotates and travels over the step and the load acting on the wheel is changed undergo almost no change even if the alignment of the wheel is altered. Accordingly, a predetermined period can be accurately determined by basing the determination on the results of the measurement of the longitudinal force or the load, even when the lateral force and the longitudinal force or the load is measured and the wheel angle is adjusted repeatedly.

Note that, as described above, when the load acting on the wheel is changed by the wheel being displaced in the vertical direction via the wheel rotating surface, the longitudinal force generated in the tire does not exhibit clear changes for the tire. Because of this, when the load acting on the vehicle is changed by displacing the wheel via the wheel rotating surface, the predetermined period may be determined by measuring both the load and the lateral force generated in the tire fitted to the wheel and comparing the results of the measurement with the load generated in the tire when the tire fitted to the wheel is substantially its normal state.

In the second aspect of the present invention, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted within the predetermined period, and a wheel angle of the wheel to be adjusted is adjusted on the basis of the results of the comparison. Therefore, as in the first aspect of the present invention, the wheel angle can be adjusted to an wheel angle in accordance with the characteristics of the tire so as to enable the steering characteristics of the vehicle to be set at substantially neutral steer.

Note that, according to the first and second aspects of the present invention, it is preferable to adjust the wheel angle of the reference wheel in advance. It is also preferable that the adjustment of the wheel angle of the reference wheel alignment be carried out in the following manner.

In the third aspect of the present invention, according to the first and second aspects of the present invention, the reference wheel is rotated on a wheel rotating surface in the proceeding direction of the vehicle, one of that the reference wheel passes over the step of the predetermined height formed on the wheel rotating surface or that the load acting on the reference wheel is changed by the predetermined amount in the predetermined period, and the lateral force generated in the tire fitted to the reference wheel is measured; and the wheel angle of the reference wheel is adjusted in advance so that an energy of a variation in the lateral force generated in the tire within the predetermined period which includes the time from when the tire of the reference wheel is deformed atone of the reference wheel passing over the step or at the load acting on the reference wheel being changed until the tire rotates and returns to substantially normal state is within a predetermined range which includes the minimum value of the energy of the vibration.

In the third aspect of the present invention, the reference wheel is rotated on a wheel rotating surface in the proceeding direction of the vehicle, one of that the reference wheel passes over the step of the predetermined height formed on the wheel rotating surface or that the load acting on the reference wheel is changed by the predetermined amount in the predetermined period, and the lateral force generated in the tire fitted to the reference wheel is measured; and the wheel angle of the reference wheel is adjusted in advance so that an energy of a variation in the lateral force generated in the tire within the predetermined period which includes the time from when the tire of the reference wheel is deformed atone of the reference wheel passing over the step or at the load acting on the reference wheel being changed until the tire rotates and returns to substantially normal state is within a predetermined range which includes the minimum value of the energy of the vibration. (e.g. the predetermined range is a range from the minimum value to a predetermined value). preferably, the wheel angle is adjusted so that the energy of the variation in the lateral force is the minimum in the adjustable range of the vehicle to be adjusted. However, there are also vehicles whose energy of the variation in the lateral force cannot be adjusted to the minimum because the wheel angle adjustment pitch (the value of the smallest changeable angle) is at variance due to the type of model (structure) and the like of the vehicle to be adjusted.

Accordingly, as is also clear from Tables 1 and 3, the alignment (wheel angle) of the reference wheel is easily adjusted to an alignment which accords with the characteristics of the tire. Thus a running stability suitable for an actual road surface and a reduction in one-sided wear can both be achieved. Further, in the third aspect of the present invention, because the alignment of the reference wheel is adjusted on the basis of the energy of the variation in the lateral force generated in the tire within the predetermined period which includes the time from when the tire of the reference wheel is deformed as the reference wheel travels over the step or as the load acting on the reference wheel is changed until the tire rotates and returns to substantially its normal state, compared to when the alignment of the reference wheel is adjusted on the basis of the lateral force during the time the longitudinal force generated in the tire is at the maximum value or close to the maximum value, there is no reduction in the precision of the adjustment of the alignment of the reference wheel due to the effects of the suspension geometry of the vehicle, as is disclosed in JP-A No. 10-7013.

By adjusting the wheel angle of the wheel to be adjusted (the non-reference wheel) according to the adjustment method according to the first or second aspects of the present invention, the front and rear balance of the vehicle is optimized and a state of substantially neutral steer is achieved, and the wheel to be adjusted is adjusted in accordance with the tire characteristics, leading to an improvement in both running stability and one-sided wear.

In the fourth aspect of the present invention, according to the first or second aspects of the present invention, the reference wheel and the wheel to be adjusted whose transitions of one of the lateral force or the rate of change in the lateral force are compared are wheels mounted on the vehicle at positions diagonally opposite to each other. In the fourth aspect of the present invention, one of the two wheels which are mounted on the vehicle at positions diagonally opposite to each other and whose transitions of the lateral force or of the rate of change in the lateral force are compared is the reference wheel and the other of the two wheels is the wheel to be adjusted. Therefore, as is clear also from a comparison of the results of the experiment shown in Tables 1 and 3, in general running conditions such as when driving in a substantially straight line or on a circuit where no great sideways acceleration is present, a better straight line stability and cornering stability performance can be obtained.

FIG. 2 shows the transition of the primary differential value (dFx/dt) in relation to the time t of the longitudinal force Fx and the primary differential value (dFy/dt) in relation to the time t of the lateral force Fy when the longitudinal force Fx and the lateral force Fy are measured by a method in which a step (an upward step and downward step) is formed in a wheel rotating surface by providing a planar-like protrusion, such as that described in the fourth aspect, and the vehicle and wheel rotating surface are moved relative to each other in such a way that the wheel rotates on the wheel rotating surface in the direction in which the vehicle moves forward and travels over the protrusion (travels over the upward step, rotates over the top surface of the protrusion (the protruding surface), and then travels down the downward step). FIG. 3 shows the transition of the primary differential value (dFz/dt) in relation to the time t of the load Fz and the primary differential value (dFy/dt) of the lateral force Fy when the load Fz and the lateral force Fy are measured under the same conditions as for FIG. 2.

Note that the (two) locations in FIG. 2 where the primary differential value of the longitudinal force suddenly undergoes a huge change in the positive or negative direction and the (two) locations in FIG. 3 where the primary differential value of the load suddenly undergoes a huge change in the positive or negative direction indicate the variation in the longitudinal force and the load caused by the deformation of the tire which occurs when the wheel travels over the upward step or the downward step. The area between the locations in FIGS. 2 and 3 where the primary differential value of the longitudinal force and the primary differential value of the load undergo a huge change corresponds to when the wheel is rotating on the top surface of the protrusion (the protruding surface) and the tire is in the process of returning to substantially its normal state, and, as is clear from FIGS. 2 and 3, the primary differential value of the longitudinal force and the primary differential value of the load are still changing during this time, even if only slightly. Consequently, in order to determine from the longitudinal force or the load (or from the primary differential value of the longitudinal force or load) whether the tire has returned to substantially its normal state when the longitudinal force or load are measured by forming a step of a predetermined height on a wheel rotating surface and rotating a wheel with the tire fitted thereon so that the wheel travels over the step, easier, the six aspect of the present invention is provided.

Because of this, in the fifth aspect of the present invention, according to the second aspect of the present invention, the step is formed on the wheel rotating surface by providing on the wheel rotating surface a substantially plate shaped protrusion whose top surface is a predetermined height above a base surface of the wheel rotating surface, and the protrusion is formed so that the protruding surface extends long enough in a direction of a relative movement of the vehicle and the wheel rotating surface for both ends of a ground-contacting portion of the tire in the direction of the relative movement to be in contact with the protruding surface when the wheel passes over the protrusion, and the predetermined period is determined to be a period from a first timing until a second timing, the first timing is when a rate of a change at least one of in the longitudinal force or the load as the wheel climbs up onto the protrusion with the tire of the wheel deforming becomes the minimum after changing to a predetermined value or more, the second timing is one of when the rate of the change at least one of in the longitudinal force or the load becomes to the minimum after changing to a predetermined value or more, or when a front end of the ground-contacting portion of the tire in the direction of the relative movement is without contacting with the protruding surface as the tire rotates on the protruding surface and the wheel descends from the protrusion with the tire of the wheel deforming.

In the sixth aspect of the present invention, the time when the rate of the change (the primary differential value) of the longitudinal force or load caused by the tire on a wheel deforming as the wheel climbs up onto the protrusion becomes the minimum (for example, substantially "0") after changing to a predetermined value or more is taken as the first timing (the timing indicated by $P_1$ in FIGS. 2 and 3), and the time when the rate of the change in the longitudinal force or the load caused by the tire on a wheel deforming as the wheel descends from the protrusion after the tire has rotated on the protruding surface becomes the minimum (namely, substantially "0") after changing to a predetermined value or more (the timing indicated by $P_2$ in FIGS. 2 and 3), or the time when the front end of the ground-contacting portion of the tire in the direction of the relative movement is not in contact with the protruding surface (for example, the timing which corresponds to the peak of the portion of the primary differential value of the longitudinal force or load changing to a predetermined value or more immediately before $P_2$) is taken as the second timing. Because the period from the first timing until the second timing is determined to be the predetermined period, the first timing and second timing can be determined easily and with a high degree of accuracy from the results of the measurement of the longitudinal force or load, thus enabling the predetermined period to be determined with a high degree of accuracy. (the wheel is the reference wheel and the wheel to be adjusted.)

In the sixth aspect of the present invention, according to the second aspect of the present invention, a wave form of one of the lateral force or the rate of change in the lateral force generated in the tire of the reference wheel within the predetermined period and a wave form of one of the lateral force or the rate of change in the lateral force generated in the tire of the wheel to be adjusted within the predetermined period are compared to obtain the difference between the two wave forms, and the wheel angle of the wheel to be adjusted is adjusted in such a way that the difference between the two wave forms is reduced.

Note that, according to the second aspect of the present invention, the wave form of the lateral force or the rate of change in the lateral force generated in the fire fitted to the reference wheel within the predetermined period and the wave form of the lateral force or the rate of change in the lateral force generated in the tire fitted to the wheel to be adjusted within the predetermined period are compared to obtain the difference between the two wave forms and the adjustment of the alignment of the wheel to be adjusted is performed in such a way that the difference between the two wave forms is reduced (in such a way that two wave form substantially coincidence), as is described specifically in the sixth aspect of the present invention.

Because, generally, a caster angle is imparted to the front wheel of a vehicle, the timing when the longitudinal force or load is greatly changed (for example, by a predetermined amount or more) due to the tire fitted to the wheel deforming as the wheel travels over the step or as the load acting on the wheel is changed is often different for the front wheel and the rear wheel of the vehicle. Therefore, in the seventh aspect of the present invention, according to the sixth aspect of the present invention, a characteristic point is extracted from the wave form of the lateral force or the rate of change in the lateral force generated in the of the reference wheel within the predetermined period and a characteristic point is extracted from the wave form of the lateral force or the rate of change in the lateral force generated in the tire of the wheel to be adjusted within the predetermined period, the two wave forms are superposed with the characteristic points superposed as a reference point so as to obtain the difference in the two wave forms.

Note that, for example, the characteristic occurring in the waveform of the lateral force or of the rate of change in the lateral force when the relative positions of the wheel and the step are substantially a predetermined position can be used as the characteristic point described in the seventh aspect of the present invention. In the seventh aspect of the present invention, because the characteristic point is extracted from the wave form of the lateral force or the rate of change in the lateral force generated in the tire fitted to the reference wheel within the predetermined period and the characteristic point is extracted from the wave form of the lateral force or the rate of change in the lateral force generated in the tire fitted to the wheel to be adjusted within the predetermined period, and the two wave forms are then superposed with the characteristic points superposed as a reference point to obtain the difference in the wave forms, the wave forms of the reference wheel and the wheel to be adjusted can be superposed with the relative position of the wheel and the step as a reference. Accordingly, even if the timing when the longitudinal force or load generated in the tire is changed by a predetermined amount or more is different for the front wheel and the rear wheel of the vehicle, the steering characteristics of the vehicle can be precisely adjusted to substantially neutral steer characteristics.

BRIEF DESCRIPTION OF THE DRAWINGS

FIG. 5 is a schematic plan view of the wheel alignment measuring apparatus.

FIG. 6 is a plan view of the tire driving apparatus.

FIG. 8A is a front view of a force sensor.

FIG. 8B is a side view of the force sensor.

DESCRIPTION OF THE PREFERRED EMBODIMENTS

Figure 4:
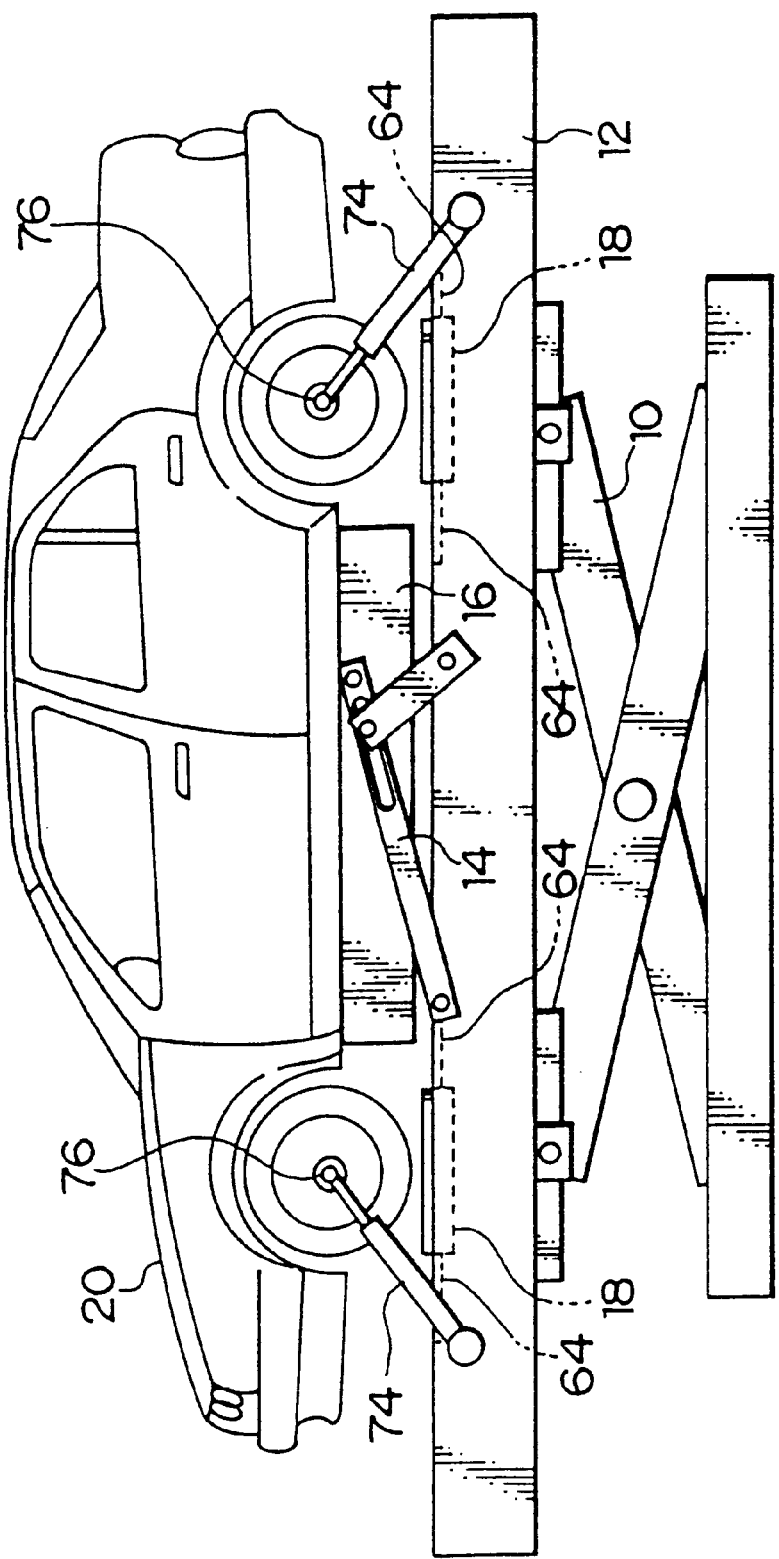
FIG. 4 is a side view of the wheel alignment measuring apparatus according to the present embodiment.

An example of the present embodiment will now be explained in detail with reference to the drawings. A vehicle wheel alignment measuring apparatus capable of being used in the present invention is shown in FIGS. 4 and 5.

This wheel alignment measuring apparatus is provided with a mounting tray 12 which is raised and lowered by a main lifting apparatus 10, and a vehicle supporting tray 16 which is raised and lowered by a sub-lifting apparatus 14 in comparison with the reference height of the mounting tray 12. Four tire-driving apparatuses 18 are attached to the mounting tray 12 to drive each wheel of a vehicle 20 to rotate. The four tire-driving apparatuses 18 each have the same structure, so only one tire-driving apparatus 18 will be explained below.

As is shown in FIG. 6, the tire-driving apparatus 18 is provided with a frame 22 comprising a pair of main frames 22A disposed in parallel with each other at a predetermined distance apart, and side plates 22B extending between the pair of main frames 22A at both ends thereof. The frame 22 is positioned so that the longitudinal direction of the main frames 22A extends in the longitudinal direction of the vehicle 20. A pair of driving shafts 24 are entrained between the pair of main frames 22A at positions in the vicinity of each side plate 22B. The pair of driving shafts 24 are rotatably supported by the main frames 22A.

Gears 26 are attached to one end of each of the driving shafts 24. The gears 26 are connected via an unillustrated driving force transmitting mechanism to a rotating shaft of an unillustrated motor whose driving action is controlled by a control device 80 (see FIG. 5). Accordingly, when the motor is driven, the driving force generated by the motor is transmitted to the driving shafts 24 via the driving force transmitting mechanism and the gears 26, thus causing each of the driving shafts 24 to rotate.

Two sprockets 28 are attached opposite each other at each end of both of the pair of driving shafts 24. Two endless chains 30 are entrained between the pair of driving shafts 24 and are also entrained around opposing pairs of the sprockets 28 (see FIG. 7B). Thus, when the driving shaft 24 rotates, the two chains 30 are also rotated via the sprocket 28.

The tire-driving apparatus 18 is provided with a plurality of elongated sections of aluminum plate 32 whose width is sufficient that they do not get pushed into the grooves in the tread pattern of the tire, and whose length is sufficiently longer than the width of the tire. The plurality of plate sections 32 are each disposed one next to the other in parallel with the side plates 22B along the longitudinal direction of the chains 30, and have one end thereof attached to one of the chains 30 and the other end thereof attached to the other chain 30 via an unillustrated connecting member.

Accordingly, as is shown in FIGS. 6 and 7, an endless track 34 is formed by connecting together a plurality of plate sections 32 in the widthwise direction of the plate sections 32 using the chain 30 and the connecting members. The endless track 34 is entrained between the pair of driving shafts 24 in such a way that the longitudinal direction of the plate sections 34 is the transverse direction of the vehicle 20. Because the pair of driving shafts 24 is supported by the frame 22, the endless track 34 is supported in a rotatable manner by the frame 22. Note that the surface formed by the upper surface of the plurality of plate sections 32 when looking at the tire-driving apparatus 18 from above is hereafter called the tire-driving surface 36 (this corresponds to the wheel rotating surface of the present invention).

Figure 7A:
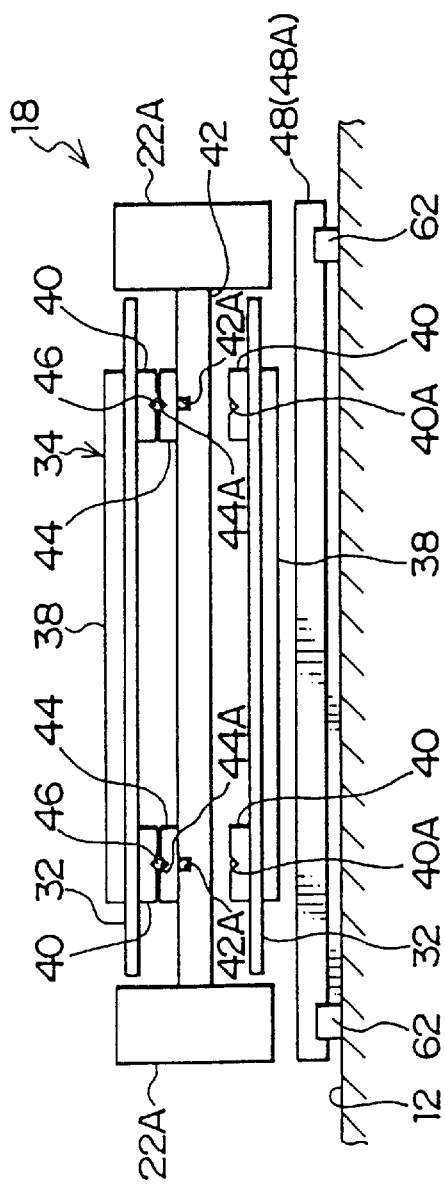
FIG. 7A is a cross-sectional view taken along the line 7A in FIG. 6.
Figure 7B:
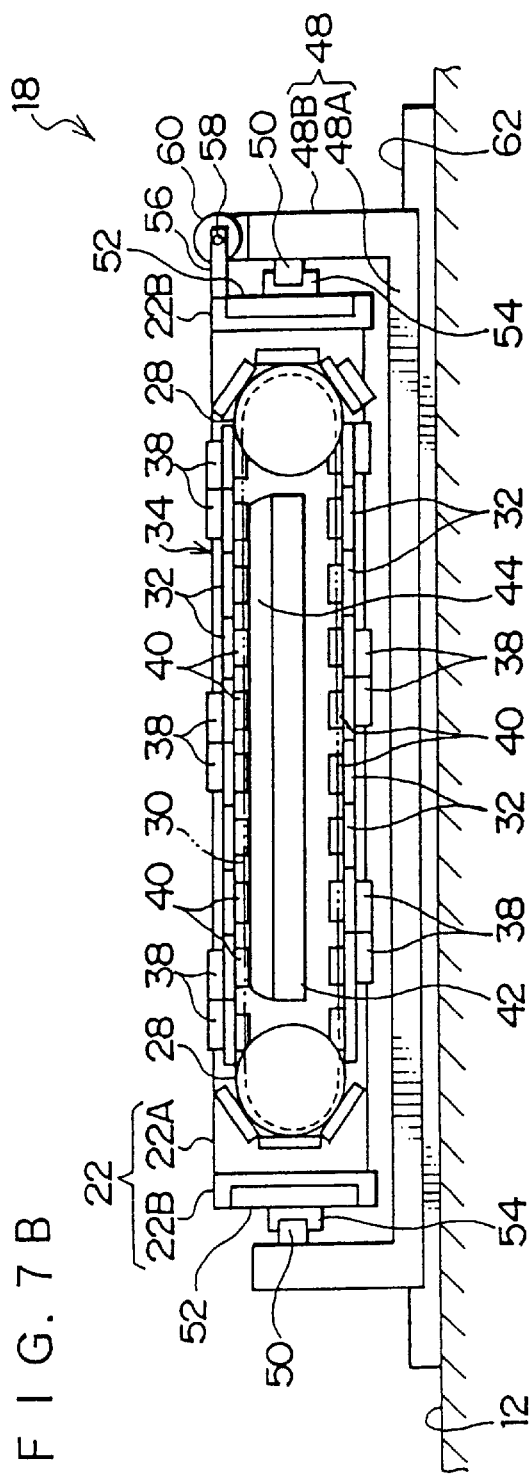
FIG. 7B is a cross-sectional view taken along the line 7B in FIG. 6.

As is shown in FIGS. 7A and 7B, a plurality of planar protrusions having a predetermined height are formed at a predetermined distance from each other in the direction in which the endless track 34 rotates on the outer surface of the endless track 34. Each protrusion 38 is formed on the top surface of two plate sections 32, i.e. on the outer surface of the endless track 34, in such a way that the protrusion 38 extends across the two adjacent plate sections 32 in the direction in which the endless track 34 rotates. The length of each protrusion 38 in the widthwise direction of the endless track 34 (the direction of rotation) is longer than the width of the tire.

When the endless track 34 is rotated, each plate section 32 moves in the direction of rotation. However, when each of the two adjacent plate sections 32 having the protrusions 38 formed thereon is moved to the position which corresponds to the tire-driving surface 36 of the endless track, the top surfaces of the two plate sections 32 become flush with each other. Therefore, the top surfaces of the two protrusions 38 formed on the top surfaces of the two plate sections 32 also become flush with each other and also become contiguous with each other. Accordingly, a single protruding portion is formed extending across a predetermined length (the length is two or three times the length in the direction of rotation of the road-contacting portion of the tire on the wheel mounted on the tire-driving surface 36) in the direction in which the endless track 34 rotates. Both edges of the protruding portion in the direction in which the endless track 34 rotates correspond to the step of the present invention. Note that, below, of the two edges, the edge which is positioned downstream from the protrusion 38 in the direction in which the wheel rotates on the tire driving surface 36 (the opposite direction to the direction in which the endless track 34 rotates) is called the upwards step, while the edge on the other side of the protrusion 38 is called the downwards step.

Due to the above structure, when the endless track 34 is rotated while a wheel of the vehicle 20 is mounted on the tire-driving surface 36 thereof, the tire rotates on the tire-driving surface 36 and travels from the top surface of the plate sections 32 over the step and climbs up onto the top surface (the protruding surface) of the protruding portion. Next the tire travels over the step from the top surface of the protruding portion and descends onto the top surface of the plate sections 32 (the base surface). This process is repeated.

As is shown in FIG. 7A, a planar guide 40 is attached to each end portion of the surface of each plate section 32 on the inner side of the endless track 34. A V-shaped engaging groove 40A is carved in each planar guide 40 running in the direction in which the endless track 34 rotates. Further, the end portions of a load bearing plate member 42 disposed so as to extend across the pair of main frames 22A are fixed to the internal surface of the pair of main frames 22A. On the top surface of this load bearing plate member 42 is fixed a guide member 44 at a position facing the planar guide 40.

V-shaped receiving grooves 44A are carved in the top surface of the guide member 44 at positions opposite the engaging grooves 40A running in the direction in which the endless track rotates. A plurality of steel balls 46 of identical size are provided between the engaging grooves 40A and the receiving grooves 44A.

Accordingly, even if the wheel of a vehicle 20 is mounted on the tire-driving surface 36 thus applying a load to the plate sections 32 forming the endless track 34, the plurality of plate sections 32 forming the tire-driving surface 36 are supported by the load bearing plate member 42 and the guide member 44 via the balls 46 in such a way that the upper surface of the plurality of plate sections 32 is an unchanging flat surface. Moreover, by driving the endless track 34 and rotating the wheel, as is described below, the force in the direction in which the endless track rotates acts on the tire-driving surface 36 and is transmitted to the frame 22 via the planar guides 40, the balls 46, the guide plates 44, and the load bearing plate member 42.

Rectangular-shaped rectangular grooves 42A are formed in the portion of the top surface of the load bearing plate member 42 covered by the guide member 44. The size of the rectangular grooves 42A is such as to allow the balls 46 to pass along the rectangular grooves 42A in the direction in which the endless track 34 rotates. Although omitted in the drawings, a U-shaped groove is formed in both end portions of the load bearing plate member 42 running in the direction in which the endless track circulates extending in a U shape between the path between the engaging groove 40A and the receiving groove 44A and the path formed by the rectangular groove 42A. The balls 46 rotate via the U-shaped groove along the path between the engaging groove 40A and the receiving groove 44A and the path formed by the rectangular groove 42A.

A supporting frame 48 is provided at the external side of the frame 22. The supporting frame 48 is formed in a substantially U shape comprising a bottom portion 48A positioned beneath the frame 22 and extending in the direction in which the endless track 34 is rotated, and a pair of supporting portions 48B extending upright from both end portions of the bottom portion 48A so that the sides thereof face the side plates 22B of the frame 22 at a predetermined distance therefrom. Left and right sliding guide rails 50 are attached to each side surface of the pair of supporting members 48B extending in the direction in which the endless track 34 rotates (the transverse direction of the vehicle).

Moving blocks 54 are attached to the side plates 22B of the frame 22 via force sensors 52, which are explained in detail below. Grooves, which fit together with the left and right sliding guide rails 50 are carved in the side surfaces of the moving block 54 and the moving block is fitted together with the left and right sliding guide rails 50 via these grooves. Accordingly, the frame 22 (and also the endless track 34) is able to move in the transverse direction of the vehicle along the left and right sliding guide rails 50.

A bracket 56 is attached to one of the pair of side plates 22B protruding towards the supporting portion 48B of the supporting frame 48. A threaded hole penetrates the distal end portion of the bracket 56 in the transverse direction of the vehicle. A threaded rotating shaft 58 is screwed into the threaded hole creating a ball-screw mechanism. One end of the rotating shaft 58 is coaxially connected to the rotating shaft of a motor 60 mounted on the supporting plate 48B of the supporting frame 48. The motor 60 is connected to the control device 80 (see FIG. 5) and the driving of the motor is controlled by the control device 80.

Because of this, when the rotating shaft is rotated by the driving of the motor 60, the bracket 56, the frame 22, and the endless track are moved as a single unit closer to or further from the supporting frame 48 in the transverse direction of the vehicle. Moreover, when the driving of the motor has been halted, movement of the frame 22 and the other members closer to or further from the supporting frame 48 in the transverse direction of the vehicle is prevented by the action of the ball-screw mechanism.

As is shown in FIGS. 8A and 8B, the force sensor 52 is provided with a pair of force measuring beams 52A which are equipped with force detecting elements such as distortion gauges and load cells. Both ends of each force measuring beam 52A are fixed to the inner portion of a rectangular frame 52C. The middle portions of each force measuring beam 52A are mutually connected by a connecting plate 52B. The force sensor 52 detects the force in two directions orthogonal to the longitudinal direction of the force measuring beam 52A (the direction orthogonal to the surface of the sheet of paper in FIG. 8A and the direction orthogonal to the surface of the sheet of paper in FIG. 8B).

Four screw holes are provided in the side plates 22B for mounting to the rectangular frame 52C, and four holes are provided in the connecting plate 52B for mounting to the moving block 54. The force sensor 52 is bolted to the side plates 22B and the moving block 54 in such a way that the longitudinal direction of the force measuring beam 52A faces in the vertical direction of the vehicle.

Accordingly, when the endless track 34 is rotated and a force is applied in the direction in which the endless track 34 rotates due to the vehicle wheel rotating on the endless track 34, this force is transmitted to the frame 22 via the sprocket 28 and the side plates 22B of the frame 22 are moved in the direction of rotation. Because of this, the force measuring beam 52A of the force sensor 52 is deformed in the direction of rotation and the size of the force in the direction of rotation is measured by the force sensor 52.

Further, when the force (lateral force) in the direction of the axis of the rotation is applied to the endless track 34 by the rotation of the wheel on the endless track 34, this force is transmitted to the frame 22 via the planar guides 40, the balls 46, the guide plates 44, and the load bearing plate member 42, thus moving the side plates 22B of the frame 22 in the direction of the axis of the rotation. Because of this, the force measuring beam 52A of the force sensor 52 is deformed in the direction of the axis of rotation and the size of the force in the direction of the axis of rotation is measured by the force sensor 52. The force sensor 52 is connected to the control device 80 (see FIG. 5) and outputs the results of the measurement to the control device 80.

A pair of longitudinal sliding guide rails 62 are mounted to the mounting tray beneath the bottom portion 48A of the supporting frame 48 extending parallel to each other in the direction of the rotation of the endless belt (the longitudinal direction of the vehicle). A pair of grooves are carved in the bottom surface of the bottom portion 48 for fitting together with the longitudinal sliding guide rails 62, and the bottom portion 48A of the supporting frame 48 is fitted together with the longitudinal sliding guide rails via the grooves. Accordingly, the supporting frame 48 is able to move in the longitudinal direction of the vehicle along the longitudinal sliding guide frames 62.

Note that the supporting frame 48 is moved in the longitudinal direction of the vehicle closer to or further from the mounting base 12 by an unillustrated driving mechanism similar to that described earlier (a ball-screw mechanism with a motor).

Note also that, of the four tire-driving apparatuses 18, the directions in which the endless tracks 34 of the pair of tire-driving apparatuses 18, on which sit the front wheels of the vehicle 20, rotate are parallel to each other. Moreover, the directions in which the endless tracks 34 of the pair of tire rotating apparatuses, on which sit the rear wheels of the vehicle 20, are also parallel to each other. Further, the direction in which the endless tracks 34 of the tire-driving apparatuses 18, on which sit the front wheels of the vehicle, rotate is identical to the direction in which the endless tracks 34 of the tire-driving apparatuses 18, on which sit the rear wheels of the vehicle, rotate.

Figure 9:
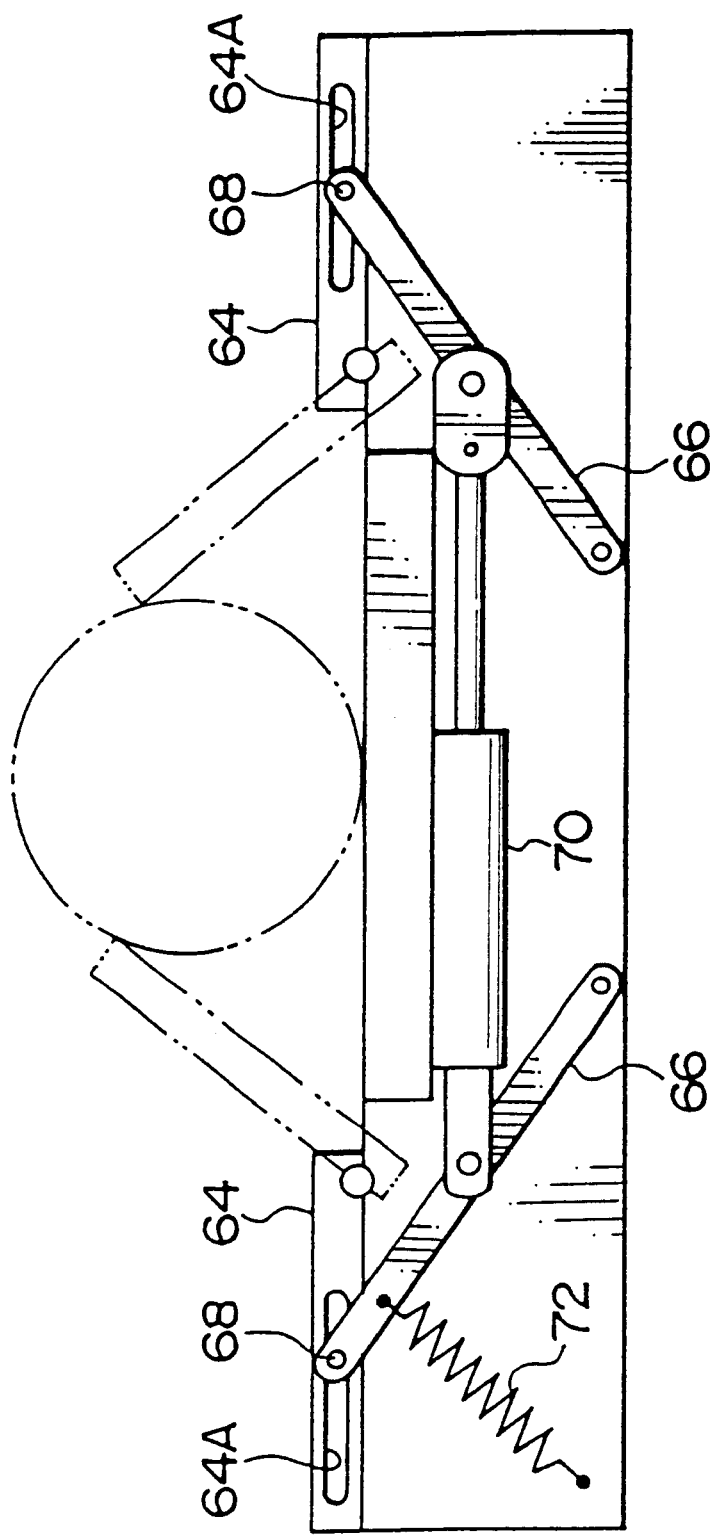
FIG. 9 is a schematic structural view of the drive mechanism of a wheel locking plate.

As is shown in FIG. 4, pairs of wheel locking plates 64 are disposed to the front and to the rear in the longitudinal direction of the vehicle of each tire-driving apparatus 18 on the mounting tray 12 and the driving mechanism shown in FIG. 9 is provided for each pair of wheel locking plates 64. When housed (i.e. in the state shown by the dotted lines in FIG. 9), the pairs of wheel locking plates 64 are substantially flush with the top surface of the mounting tray 12, and the end of each plate in the longitudinal direction of the vehicle which is closest to the wheel driving apparatus 18 is rotatably supported by the mounting tray 18.

A pair of levers 66 is provided for each pair of wheel locking plates 64. Elongated holes 64A are formed in the middle portion in the longitudinal direction of the vehicle of each of the side surfaces of the wheel locking plates 64. The upper end portion of each lever 66 is movably held by a pin 68 in each elongated hole 64A. When the wheel locking plate 64 is housed, the bottom end portion of each of the pairs of levers 66 is rotatably supported by the mounting tray 12 in such a manner that the distance between the bottom end portion of each of a pair of levers 66 is shortened, the closer to the bottom end portion of the lever.

Moreover, the central portions of each lever of a pair of levers 66 are connected to each other via a hydraulic cylinder. The central portion of one lever of each pair of levers 66 is connected to one end of an extension coil spring, the other end of which is attached to the mounting tray 12.

The hydraulic cylinder 70 is connected to the control device 80 (see FIG. 5), and is expanded and contracted by the control device 80. As the length of the hydraulic cylinder 70 is gradually shortened to less than the length shown in FIG. 9, the pairs of levers 66 gradually approach an upright position against the urging force of the extension coil spring 72 and the distance between the top end portions of each lever of the pairs levers 66 is gradually shortened. In accompaniment to this action, each plate of the pairs of wheel locking plates 64 begins to rotate. As is shown by the double dot dash line in FIG. 9, when a wheel is positioned on the tire-driving apparatus 18, then as the distal end portion of each plate of the pair of wheel locking plates 64 makes contact with the wheel, rotation of the wheel in the longitudinal direction of the vehicle is prevented.

Figure 10:
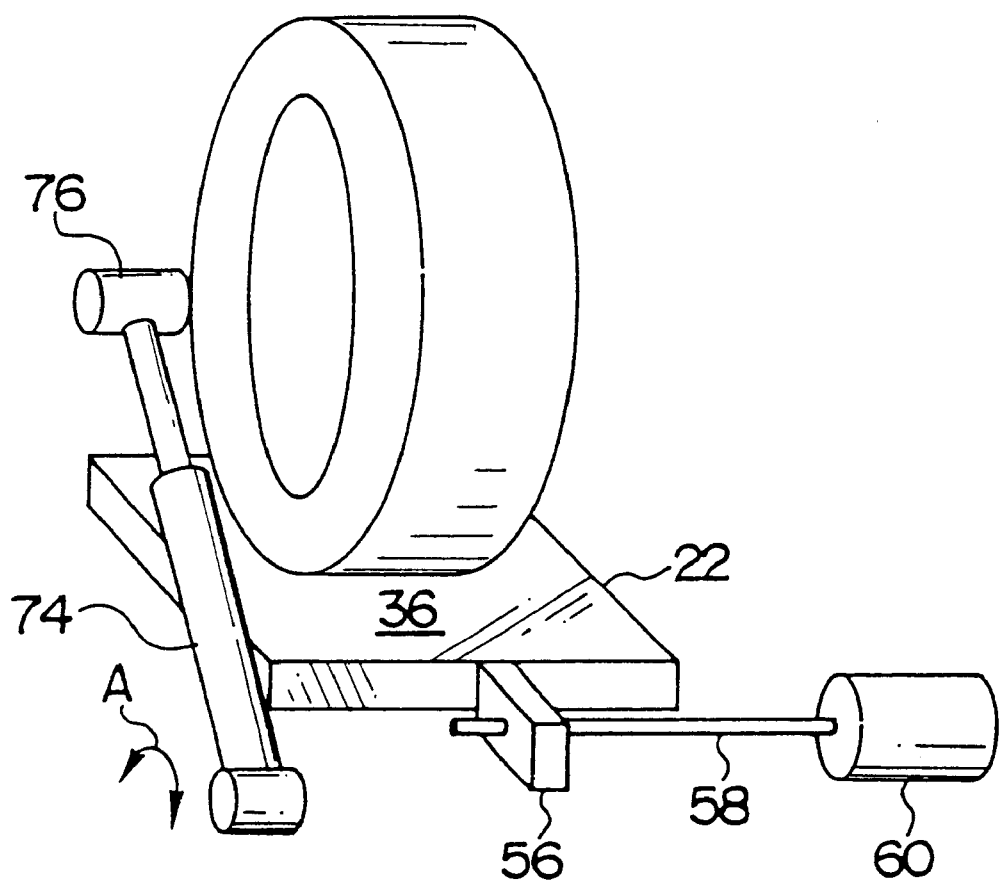
FIG. 10 is a schematic diagram showing the position adjusting mechanism of a distance sensor and tire driving apparatus.

Rods 74 are attached to the sides of the mounting tray 12 at four positions corresponding to the four tire-driving apparatuses 18. As is shown in FIG. 10, each rod 74 is supported so as to be rotatable in the direction indicated by the arrow A in FIG. 10, and is also able to expand and contract. A distance sensor 76 is attached to the distal end of each rod 74. A non-contacting type of sensor, for example, one that irradiates a laser light onto an object and detects the distance between itself and the object by receiving the laser light reflected back by the object, may be used for the distance sensor 76.

When a wheel is positioned on top of the tire-driving apparatus 18, each rod 74 is either expanded or contracted and rotated manually so that the distance sensor faces the center of the wheel. This enables the distance sensor 76 to detect the distance between itself and the wheel positioned on the tire-driving apparatus 18. The distance sensor 76 is connected to the control device 80 (see FIG. 5) and the results of the detection of the distance to the wheel are output to the control device 80.

A microcomputer, for example, may be used for the control device 80 shown in FIG. 5. A display unit 82 comprising a CRT or the like for displaying the values of the measurements made by the force sensor 52, the direction in which the wheel alignment is to be adjusted, and the like is connected to the control device 80.

An explanation will now be given of the wheel alignment adjustment method using the above described wheel alignment measuring apparatus as an effect of the present embodiment.

Firstly, the operator moves the supporting frame 48 of each tire-driving apparatus 18 in the longitudinal direction of the vehicle along the longitudinal sliding guide rails 62 so that the four tire-driving apparatuses 18 are positioned to correspond with the four wheels of the vehicle to be adjusted in accordance with the wheel base and longitudinal tread base of the vehicle to be adjusted. The operator also moves the frame 22 in the transverse direction of the vehicle along the transverse sliding guide rails and thus adjusts the position of each tire-driving apparatus 18 on the mounting tray 12.

Note here that because the above movements are performed using the driving force of a motor via the ball-screw mechanism, if the motor drive is stopped, the tire-driving apparatus 18 is locked in the adjusted position by the ball-screw mechanism.

Next, each of the wheels of the vehicle 20 is positioned on a tire-driving surface 36 of the tire-driving apparatus 18 and the vehicle 20 is moved on the mounting tray 12 with the steering wheel of the vehicle 20 turned to the direction of rectilinear forward movement so that the center line of the body is substantially parallel to the direction in which the endless track 34 of the tire-driving apparatus 18 rotates. Next, each rod 74 is manually expanded or contracted and rotated so that the distance sensor 76 faces the center of each of the wheels.

Figure 11:
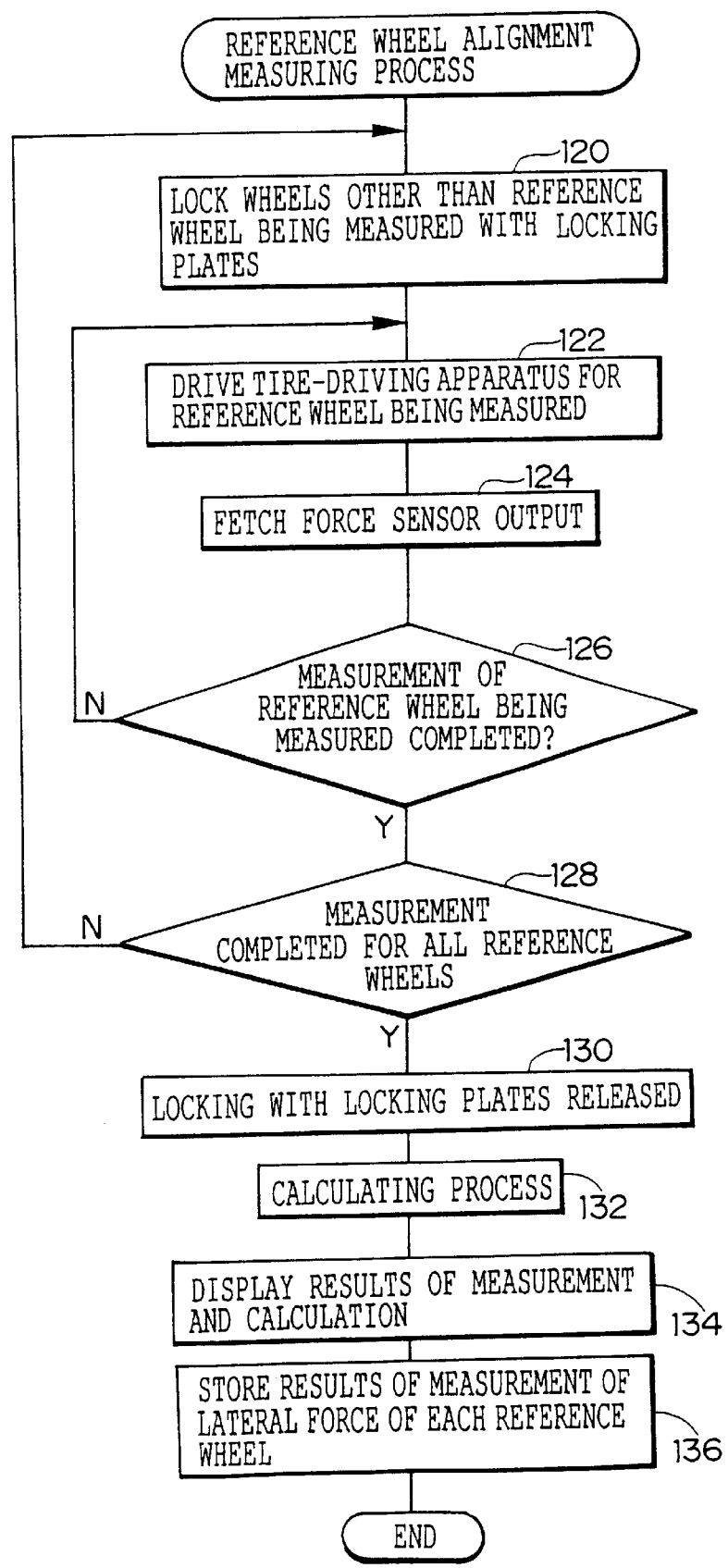
FIG. 11 is a flow chart showing the reference wheel alignment measurement process.
Figure 12:
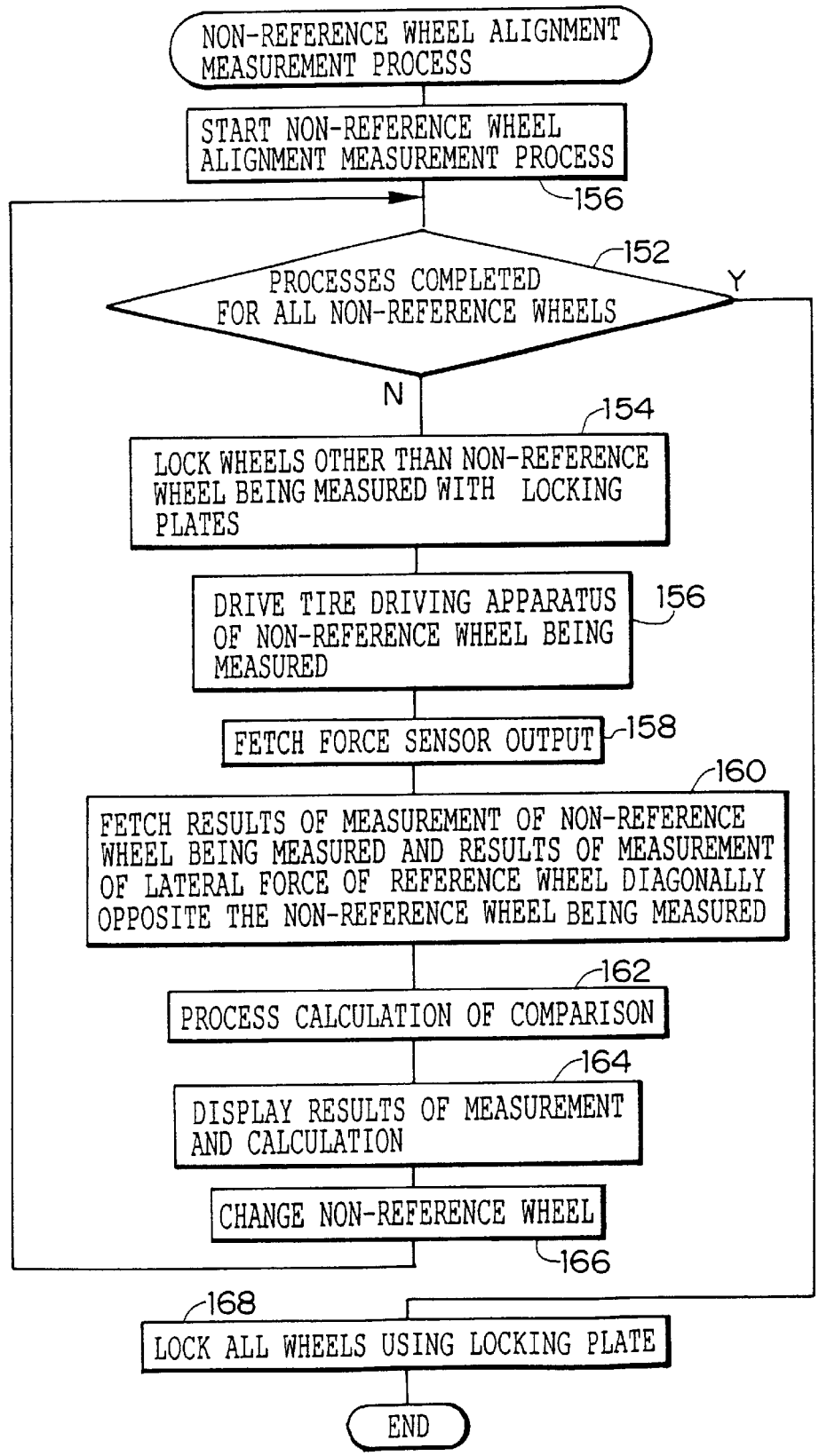
FIG. 12 is a flow chart showing the non-reference wheel alignment measurement process.
Figure 13:
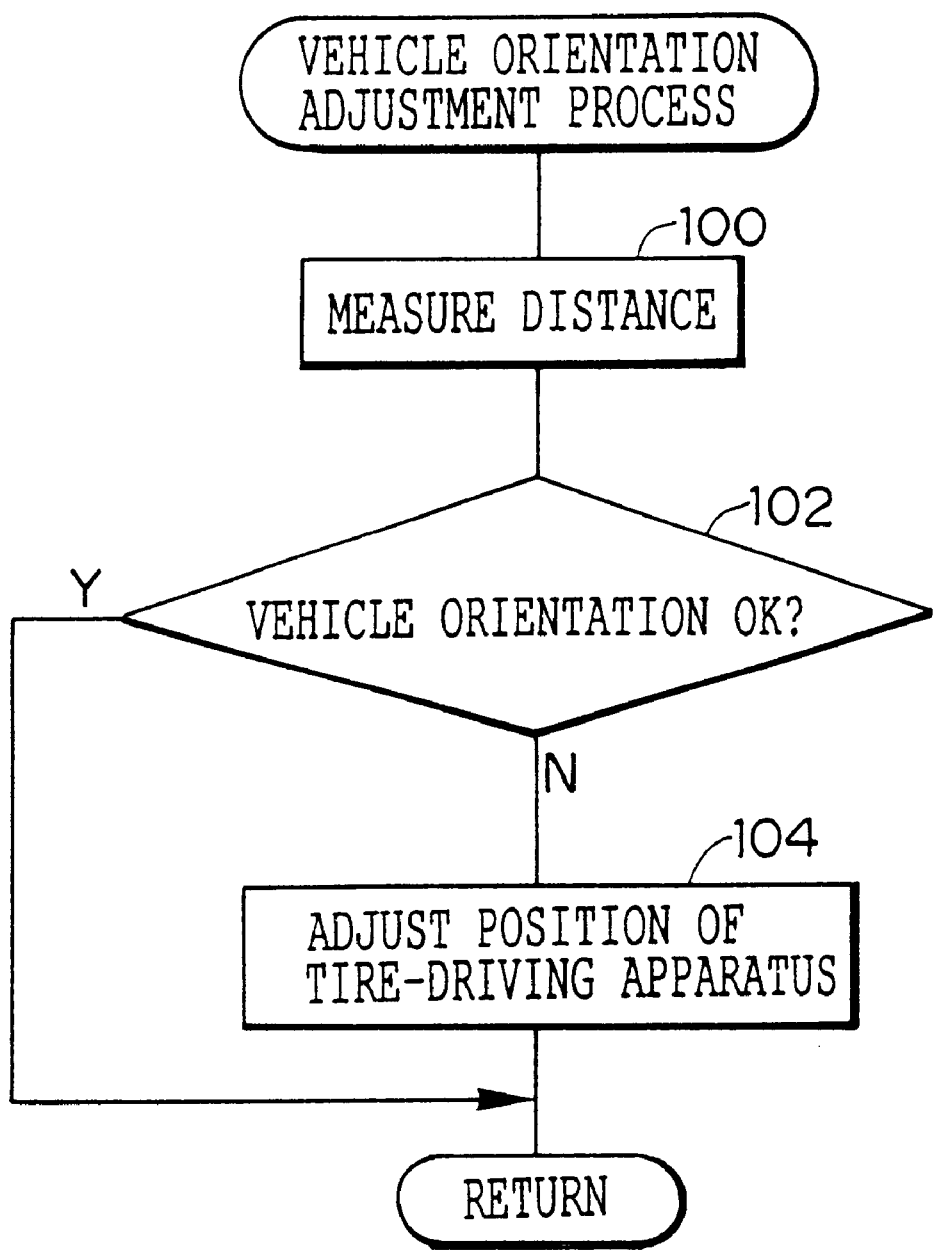
FIG. 13 is a flow chart showing the vehicle orientation adjusting process.

When the above operation is completed, the operator instructs the control device 80 to measure the wheel alignment. Consequently, the steps in the reference wheel alignment measuring process shown in FIG. 11 are performed in sequence. After the adjustment of the alignment of the reference wheel is completed, the steps in the non-reference wheel alignment measuring process shown in FIG. 12 are performed in sequence. The vehicle orientation adjustment process shown in FIG. 13 is also performed in cycles of a predetermined length of time. An explanation is given below of the vehicle orientation adjustment process, with reference made to FIG. 13.

In step 100, the distance between each wheel sensor 76 and the center of each corresponding wheel on the vehicle is measured by the distance sensors 76 (these distances are shown as a, b, A, and B in FIG. 13). In step 102, the value obtained by subtracting the distance b from the distance sensor 76 to the center of the left rear wheel of the vehicle from the distance a from the distance sensor 76 to the center of the left front wheel of the vehicle (a–b), and the value obtained by subtracting the distance B from the distance sensor 76 to the center of the right rear wheel of the vehicle from the distance A from the distance sensor 76 to the center of the right front wheel of the vehicle (A–B) are compared, and on the basis of the comparison a determination is made as to whether or not the orientation of the vehicle is correct.

In step 102, if the value of (a–b) is the same as the value of (A–B), then, even if the tread base of the front wheels of the vehicle 20 and the tread base of the rear wheels of the vehicle 20 are at variance, it can be determined that the center line of the body is parallel to the direction in which each tire driving apparatus 18 of the wheel alignment measuring apparatus rotates and the determination of step 102 is affirmative. The vehicle orientation process is then completed with no further process performed.

On the other hand, if the value of (a–b) is not the same as the value of (A–B) in step 102, a negative determination is made and the routine proceeds to step 104. In step 104, the distance to be moved by the tire driving apparatus in order for the value of (a–b) to match the value of (A–B) is calculated and, on the basis of the calculation, the motor 60 is driven and the position of the tire driving apparatus 18 is adjusted by being moved in the direction of the axis of rotation. This allows the orientation of the vehicle to be adjusted so that the center line of the body is parallel to the direction in which the tire driving apparatus 18 of the wheel alignment measuring apparatus rotates. Using the above-described process, even if the center line of the body of a vehicle moved to the top of the mounting tray 12 is not parallel to the direction in which the tire driving apparatuses 18 rotate, the orientation of the vehicle can still be corrected so that the two are in parallel.

In the wheel alignment measurement process (FIGS. 11 and 12) described below, one wheel at a time of the vehicle 20 is rotated by the tire driving apparatus 18. If one wheel at a time of the vehicle 20 is rotated, then, because of the force in the direction of the axis of rotation generated by the rotating wheel, a distortion still arises in the non-rotating tires minutely displacing the vehicle body and changing the alignment of the wheel rotating on the tire driving surface 36. However, because the afore-mentioned vehicle body orientation adjusting process is performed cyclically even when the wheel is being rotated and the vehicle body posture is displaced by the distortion of the tires which are not rotating and the tire driving apparatus 18 is moved in such a way that the alignment of the rotating wheels on the tire driving surface 36 is kept in the same state as when the vehicle body posture is not displaced, the alignment of the rotating wheel on the tire driving surface 36 is kept constant and the accuracy of the measurement in the wheel alignment measuring process is improved.

Next, the reference wheel alignment measuring process is explained with reference made to the flow chart shown in FIG. 11. Note that in the present embodiment, the rear axle of the vehicle is determined to be the reference axis. Therefore, in the reference wheel alignment measuring process, the alignments of the left and right wheels mounted on the rear axle are measured.

In step 120, the wheel locking plates 64 of the three wheels other than the reference wheel to be measured are rotated by the hydraulic cylinder 70 to lock the three non-measured wheels immovably in the longitudinal direction of the vehicle. Note that, instead of locking the wheel with the wheel locking plate 64, it is also possible to use the jacking points provided in the vehicle 20 or the like to fix the vehicle so as to prevent movement of the vehicle in the longitudinal direction thereof. However, in this case, it is necessary to ensure that, by this fixing of the vehicle body, any force other than the wheel driving force does not apply to the vehicle body.

In the next step 122, the tire driving apparatus 18 of the reference wheel to be measured is rotated. This causes the reference wheel to be measured to rotate on the tire driving surface 36. Accordingly, the reference wheel to be measured repeatedly travels from the top surface of the plate sections 32 up onto the top surface of the protruding portions, and then from the top surface of the protruding portions descends back onto the top surface of the plate sections 32.

The travelling of the wheel up onto the top surface of the protrusion and then back down onto the tops surface of the plate sections generates longitudinal force Fx (force in the direction of rotation), lateral force Fy (force in the direction of the axis of the rotation, and load Fz (vertical force onto the tire driving surface in the tire of the reference wheel to be measured). In the present embodiment, however, of the above three forces, the longitudinal force Fx and the lateral force Fy are measured by the force sensor 52. Therefore, in step 124, the output (the values of the measurements of the longitudinal force Fx and the lateral force Fy) from the force sensor 52 is sampled and the values of the measurements of the longitudinal force Fx and the lateral force Fy obtained from the sampling is stored in a storage means such as the memory.

In the next step 126, a determination is made as to whether or not the measuring of the reference wheel to be measured is completed. If the determination is negative, the routine returns to step 122 and the processes of steps 122 to 126 are repeated in comparatively short cycles. The longitudinal force Fx and the lateral force Fy generated by the reference wheel to be measured rotating on the tire driving surface 36 are thus measured in comparatively short cycles and the results of the measuring stored in sequence until the determination of step 126 is affirmative.

When certain conditions are fulfilled, such as the passage of a predetermined time, or the completion of a predetermined number of rotations of the tire, or the amount of data for the measurements stored in the memory has reached a predetermined amount (these conditions are set so that the continuous measuring of the longitudinal force Fx and the lateral force Fy during the period from when the wheel rides up onto a protruding portion until the wheel descends from the protruding portion is performed at least once), the determination of step 126 is affirmative and the routine proceeds to step 128. In step 128, a determination is made as to whether or not the above measuring process has been performed for all the wheels of the vehicle 20. If the determination is negative, the routine returns to step 120 and the processes are repeated with another wheel as the reference wheel to be measured.

When the measuring process has been performed for all the wheels of the vehicle and all the data for each wheel has been collected, an affirmative determination is made in step 128. In step 130, the lock of the wheel locking plate 64 is released and the routine then proceeds to step 132. In step 132, the direction of the toe angle adjustment (i.e. does the wheel need to be adjusted in the toe-in direction or the toe-out direction) is calculated for each of the wheels of the vehicle. The calculation for one wheel is performed as described below.

Firstly, the values of the plurality of measurements of the longitudinal force Fx and the lateral force Fy of the wheel to be processed are fetched from the values of all the measurements of the longitudinal forces Fx and the lateral forces Fy accumulated and stored in the storage means. Next, each primary differential value in relation to the time (dFx/dt: the rate of change of the longitudinal force Fx) is calculated for the plurality of measured values of the longitudinal force Fx. Note that, if the data for the primary differential value of the longitudinal force (dFx/dt) determined by the calculation is plotted along a time axis, an example of the resulting wave form is shown by the thin solid line in FIG. 2.

Next, from the (series of) data of the longitudinal force primary differential value (dFx/dt), the (series of) data corresponding to when the wheel traveled over the step is extracted (namely, the (series of) data when the wheel traveled over the upward step and the (series of) data when the wheel traveled over the downward step are extracted). As is also clear from FIG. 2, because the tire is hugely deformed when the wheel travels over the step, a characteristic pattern arises in the data of the longitudinal force primary differential value (dFx/dt) in which two large variations each of which occurs in the direction, namely, a large variation in the positive direction and a large variation in the negative direction each having a predetermined amplitude or greater occur in sequence. Moreover, when the wheel travels over the upward step, a negative variation is followed by a positive variation. When the wheel travels over the downwards step, a positive variation is followed by a negative variation.

Accordingly, the extraction of the data corresponding to when the vehicle traveled over the upwards step and the downwards step can be achieved in the following way. For example, the data for an absolute value over a predetermined value is extracted from the data for the longitudinal force primary differential value (dFx/dt) and this extracted data is regarded as data for the peak or the vicinity of the peak caused by the passage of the wheel over the step. If the characteristic variation pattern for the upward step or the characteristic variation pattern for the downward step occurs in the (series of) data obtained from the measurement within a predetermined period which includes the data, then that (series of) data is extracted as the data for when the wheel traveled over the upward step or for when the wheel traveled over the downward step.

Figure 1:
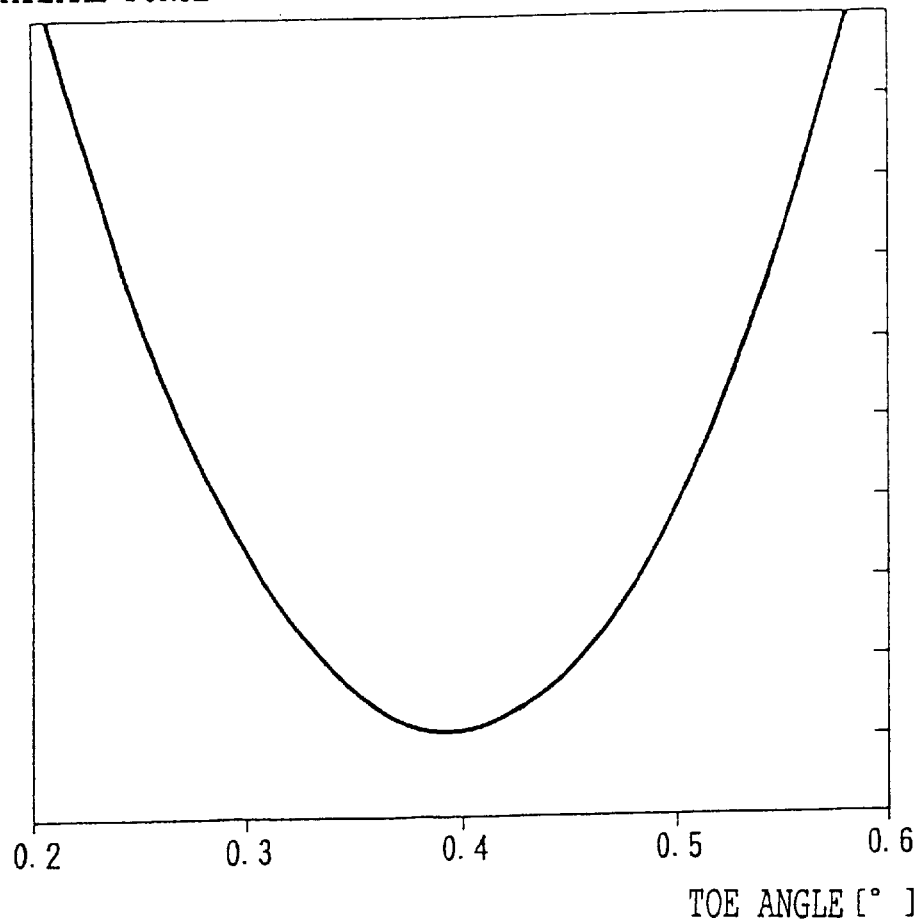
FIG. 1 is a line graph showing an example of the relationship between the alignment of the wheel (the toe angle) and the energy of the variation in the lateral force generated in the tire within a predetermined period which includes the time from when the tire is deformed as the wheel travels over the step until the tire rotates and returns substantially to its normal state.
Figure 2:
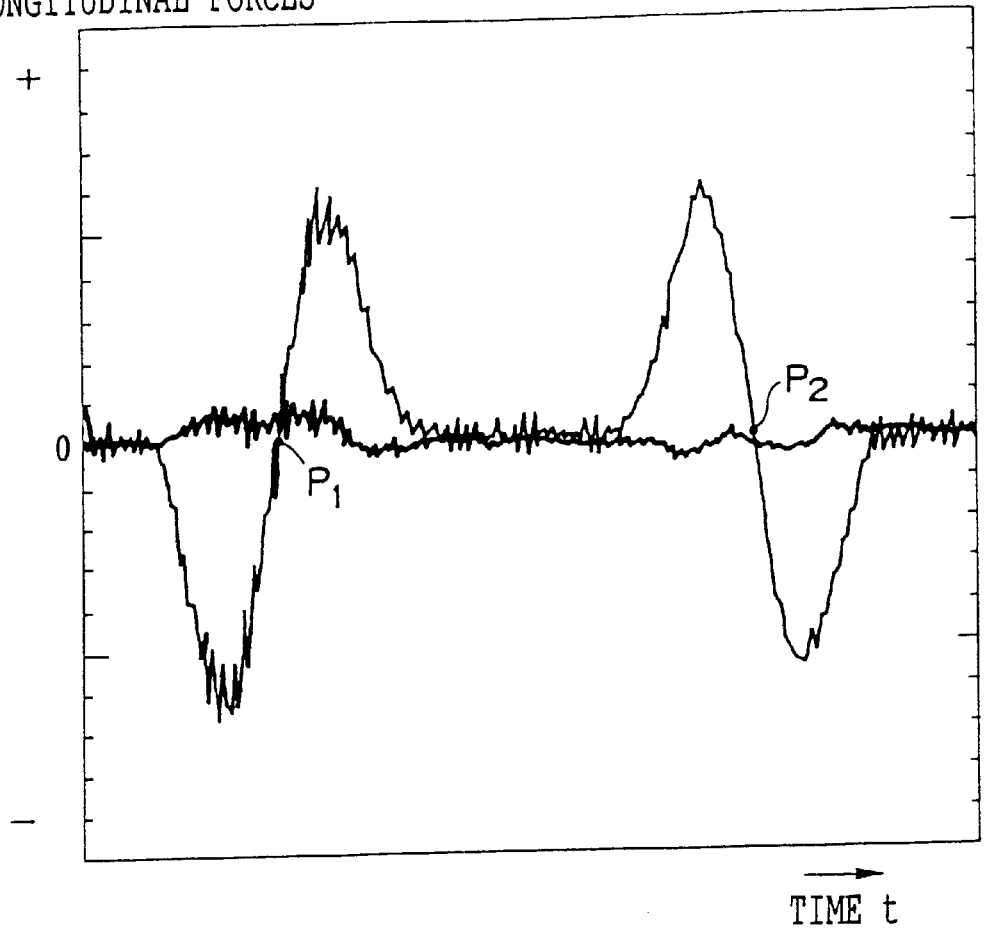
FIG. 2 is a line graph showing examples of the transition of the primary differential value of the longitudinal force generated in the tire when the wheel travels over the upward step and then the downward step and the transition of the primary differential value of the lateral force generated in the tire when the wheel travels over the upward step and then the downward step.

Next, the timing when the (absolute value of the) primary differential value of the longitudinal force, after the first of the two large variations forming the characteristic change pattern has occurred, is at the minimum (namely, the timing when the absolute value of the longitudinal force is at the maximum—i.e. the timing indicated by $P_1$ in FIG. 2) is determined from the data extracted for when the wheel traveled over the upward step by the above process. Specifically, the data for the boundary when the polarity (positivity or negativity) of the primary differential value of the longitudinal force changes (the data, for the point in a time sequence, where the polarity of the previous data is different to the polarity of the subsequent data) is extracted from the above-described extracted (series of) data, for example. The timing determined from this data is determined to be the timing when the (absolute value of the) primary differential value of the longitudinal force is at the minimum. This timing corresponds to the first timing described in the sixth aspect of the present invention.

Next, the timing when the (absolute value of the) primary differential value of the longitudinal force, after the first of the two large variations forming the characteristic change pattern has occurred, is at the minimum (namely, the timing when the absolute value of the longitudinal force is at the maximum—i.e. the timing indicated by $P_2$ in FIG. 2) is determined from the data for when the wheel traveled over the downward step, in the same way as the first timing. This timing corresponds to the second timing described in the sixth aspect of the present invention.

Next, the values of the measurements of the lateral force Fy measured within the period between the first timing and the second timing (corresponding to the predetermined period of the present invention) are extracted from the values of the measurements of the lateral force Fy fetched from the storage means and the primary differential value of each is calculated in relation to the time (dFy/dt: the rate of change of the lateral force Fy). Note here that, if the data for the primary differential value of the lateral force (dFy/dt) determined by the calculation are plotted along a time axis, an example of the resulting wave form is shown by the thick solid line in FIG. 2.

Next, the energy of the variation in the lateral force Fy within the predetermined period is calculated. In the present embodiment, the sum of the square root of the primary differential value of the lateral force (dFy/dt) is calculated to find the energy of the variation in the lateral force Fy (see the following formula).

$$E=\Sigma(dFy/dt)^2$$

The direction of the toe angle adjustment (i.e. does the wheel need to be adjusted in the toe-in direction or the toe-out direction) is then calculated on the basis of the calculated energy of the of the variation in the lateral force Fy (the sum E of the square roots of the primary differential value of the lateral force).

Note that the optimum toe angle is the angle at which the sum E of the square roots (the energy of the variation in the lateral force) is at the minimum, however, in order to obtain the toe angle at which the sum E of the square roots is at the minimum, it is necessary to repeatedly measure the longitudinal force Fx (or the load Fz) and the lateral force Fy while altering the toe angle. Moreover, it is difficult to determine the direction in which the toe angle should be adjusted from the value of the sum E of the square roots obtained from one measurement. Therefore, it is preferable to calculate the direction of the toe angle adjustment using the summation of the primary differential value of the lateral force S (see the following formula) together with the sum E of the square roots.

$$S=\Sigma(dFy/dt)$$

The toe angle at which the above summation S=0 does not always match the toe angle at which the sum E of the square roots is at the minimum, however, it is close to the toe angle at which the sum E of the square roots is at the minimum. Therefore, by calculating the direction of toe angle adjustment in combination with the summation S of the primary differential value of the lateral force (for example, by determining the direction of toe angle adjustment from the summation S when the direction of toe angle adjustment cannot be determined from the sum E of the square roots), the number of measurements of the longitudinal force Fx (or the load Fz) and the lateral force Fy may be reduced. In step 132, the direction of toe angle adjustment for each wheel of the vehicle is determined by performing each of the above-described processes.

In the next step 134, the calculated energy of the variation in the lateral force Fy (the sum E of the square roots of the primary differential value of the lateral force), and the direction of the toe angle adjustment are displayed on the display unit 82 for each reference wheel. In step 136, the data series indicating the transition of the lateral force Fy within the predetermined period for each reference wheel are stored in the storage means, and the processes are completed temporarily.

On the basis of the information displayed on the display unit 82, the operator is easily able to determine whether or not there is a need to adjust the toe angle of each wheel, and if there is a need to adjust the toe angle, then in which direction the toe angle needs to be adjusted and by how much. After the operator has adjusted the toe angle of each reference wheel of the vehicle 20, if the toe angle needs to be checked again, an instruction is given to repeat the above-described reference wheel alignment measuring process. Subsequently, in the manner described above, a determination is again made as to whether or not the wheel alignment after the toe angle adjustment is suitable on the basis of the longitudinal force and the lateral force.

Through this method, the alignment of the reference wheels of the vehicle 20 can be appropriately adjusted so that, regardless of the type of tire fitted to the vehicle 20, a high degree of running stability on an actual road surface in accordance with the characteristics of the tire can be achieved and one-sided wear resistance can be improved. Note that the operation of adjusting the wheel alignment by an operator and the above-described reference wheel alignment measurement process correspond to the reference wheel alignment adjustment according to the third aspect of the present invention.

Next, the non-reference wheel alignment measurement process, performed after the reference wheel alignment adjustment has been completed, is explained with reference made to the flow chart shown in FIG. 12. In the non-reference wheel alignment measurement process, the wheel alignment of the front-left and front-right wheels mounted on the front axle of the vehicle are measured.

In the non-reference wheel alignment measurement process, firstly, in step 150, the settings for the non-reference wheel to be processed and other initial settings are made in order to begin the non-reference wheel alignment measurement process. In the next step 152, a determination is made as to whether or not the processing has been performed for all the non-reference wheels of the vehicle 20. If the determination is negative, the routine proceeds to step 154 and, in steps 154 through 158, the non-reference wheels are rotated on the tire driving surface 36 and the longitudinal and lateral forces are measured in the same way as in steps 120 through 124 of the reference wheel alignment measurement process explained in FIG. 11 above.

Namely, in step 154, the three wheels other than the non-reference wheel to be processed (being the left or right front wheel) are locked by the wheel locking plate 64 and, in step 156, the tire driving apparatus 18 for the non-reference wheel being processed is rotated. In step 158, the non-reference wheel being processed is rotate d on the tire driving surface 36. The non-reference wheel being processed then repeatedly climbs up onto and then descends down from the protruding portion and the values, measured by the force sensor 52, of the longitudinal force Fx and the lateral force Fy among the longitudinal force Fx, the lateral force Fy, and the load Fz generated in the tire fitted to the non-reference wheel being processed a restored in a memory means such as a computer memory. Once the process of measuring the non-reference wheel being measured is completed, the routine proceeds to step 160.

In step 160, values measured for the longitudinal force Fx and lateral force Fy of the non-reference wheel being processed (the left or right front wheel) are fetched. Data (the data indicating the transition of the lateral force Fy within a predetermined period) for the reference wheel mounted on the diagonally opposite side of the vehicle from the non-reference wheel being processed (for example, when the non-reference wheel is the front-left wheel, the reference wheel is the right-rear wheel, and when the non-reference wheel being processed is the right-front wheel, the reference wheel is the left-rear wheel) is also fetched. Note that, because the reference wheel data is repeatedly measured and calculated and then stored in the storage means each time the reference wheel alignment measurement process is performed, in step 162, the most up-to-date reference wheel data, after adjustment to an appropriate alignment by the reference wheel alignment measurement process and the wheel alignment adjustment operation, is fetched.

In the next step 162, the non-reference wheel data for the wheel being processed and the reference wheel data are compared and the direction of adjustment for toe angle of the non-reference wheel being processed is calculated. This calculation is performed as described below.

Firstly, in the same way as the calculation of the direction in which the toe angle of the reference wheel is to be adjusted, the primary differential values in relation to the time (dFx/dt: rate of change in the longitudinal force) are calculated from the values measured for the longitudinal force Fx of the non-reference wheel being processed, each data series corresponding to when the non-reference wheel being processed travels over the step (the upward step and the downward step) is extracted from the data series of the primary differential values of the longitudinal force (dFx/dt), and the timing when (the absolute value of) the primary differential value of the longitudinal force is at the minimum after the occurrence of the first large variation (namely, the timing when the absolute value of the longitudinal force is at the maximum—the first timing according to the fifth aspect of the present invention) is determined from the data for when the non-reference wheel being processed travels over the upward step. The timing when the (absolute value of the) primary differential of the longitudinal force is at the minimum after the occurrence of the first large variation (namely, the timing when the absolute value of the longitudinal force is at the maximum—the second timing according to the fifth aspect of the present invention) is determined from the data for when the non-reference wheel being processed travels over the downward step.

Next, the values of the measurements of the lateral force Fy measured within the period from the first timing to the second timing (this period corresponds to the predetermined period of the second aspect of the present invention) are extracted from the values of the measurements of the lateral force Fy of the non-reference wheel being processed. This enables the data series indicating the transition of the lateral force Fy of the non-reference wheel being processed within the predetermined period to be obtained.

Next, the difference in the wave form of the lateral force Fy of the non-reference wheel within the predetermined period and the wave form of the lateral force Fy of the reference wheel within the predetermined period is obtained on the basis of the data indicating the transition of the lateral force Fy of the reference wheel within the predetermined period and the data indicating the transition of the lateral force Fy of the non-reference wheel to be adjusted within the predetermined period. This difference in the wave forms is calculated by extracting the maximum values of the lateral force Fy of both wheels within the predetermined period from the data indicating the transitions of the lateral force Fy of both wheels within the predetermined period, superposing both wave forms so that the point where the lateral force Fy is at maximum in the wave forms of both wheels becomes the common reference point, and calculating the differences in the timings (at each position on the time axis) in both wave forms. The direction in which the toe angle should be adjusted (i.e. whether the toe angle should be adjusted in the toe-in direction or the toe-out direction) is calculated on the basis of the difference between the wave form of the lateral force Fy of the non-reference wheel and the wave form of the lateral force Fy of the reference wheel (specifically, the positivity or negativity and size of the value of the calculated difference in the wave forms).

Figure 15A:
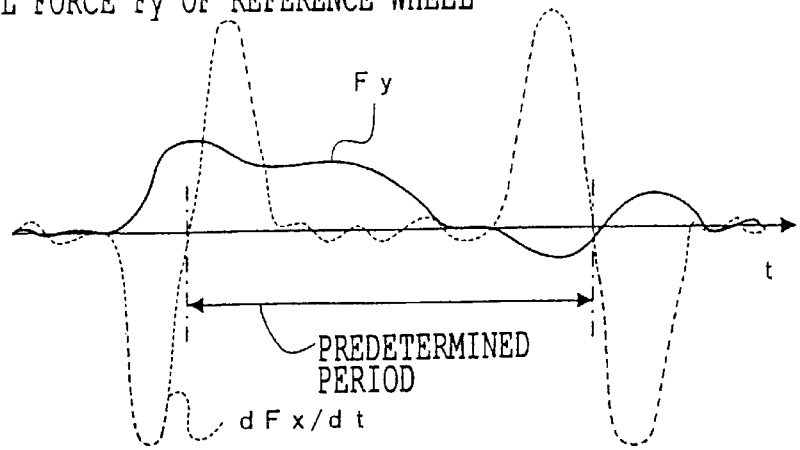
FIG. 15A is a line graph showing an example of the transition of the rate of change of the longitudinal force and the lateral force of the reference wheel.
Figure 15B:
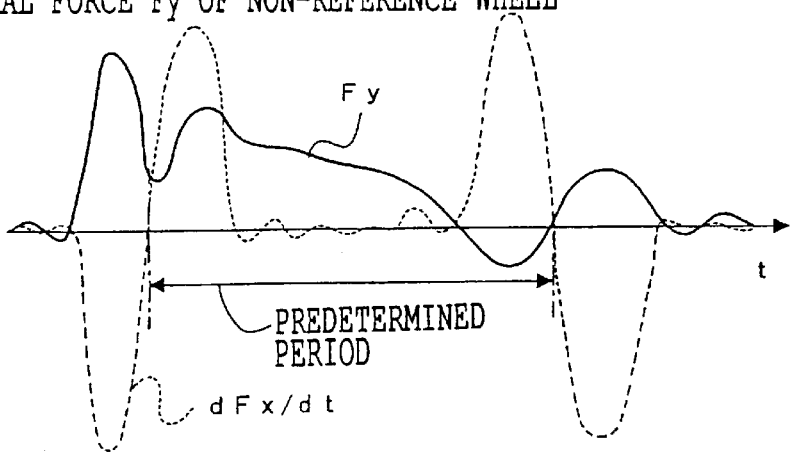
FIG. 15B is a line graph showing an example of the transition of the rate of change of the longitudinal force and the lateral force of the non-reference wheel.
Figure 15C:
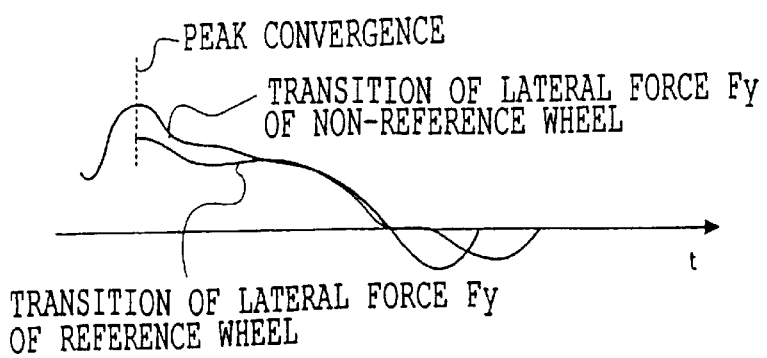
FIG. 15C is a line graph showing a comparison of the waveforms of the lateral force of the non-reference wheel and the reference wheel.

Accordingly, when the transitions of the lateral force Fy of the reference wheel and the lateral force Fy of the non-reference wheel have the wave forms shown in FIGS. 15A and 15B, then, as is shown in FIG. 15C, the two wave forms are superposed so that the maximum point of the lateral force in the two wave forms within the predetermined period are positioned at the same point on the time axis (denoted as peak convergence in FIG. 15C), the difference in the wave forms of the lateral forces of the reference tire and the non-reference tire are calculated and the direction in which the toe angle is to be corrected is thus calculated.

In the next step 164, the difference in the wave forms of the lateral forces of the reference tire and the non-reference tire to be adjusted and the direction in which the toe angle is to be adjusted are displayed on the display unit 82. Accordingly, the operator is able to determine whether or not there is a need to adjust the toe angle of the non-reference wheel being adjusted (processed) on the basis of the information displayed on the display unit 82, and if there is a need to adjust the toe angle, the operator can easily determine the direction and the extent of the adjustment.

In the next step 166, the non-processed non-reference wheel becomes the next non-reference wheel to be processed and the routine returns to step 152. Accordingly, when a negative determination is repeated in step 152, the processes of steps 154 to 164 are repeated on the new non-reference wheel to be processed. Accordingly, the difference in the wave forms of the lateral forces of the reference tire and the non-reference tire to be adjusted and the direction in which the toe angle is to be adjusted are newly displayed on the display unit 82. Consequently, once the above-described processes have been performed for all the non-reference wheels, an affirmative determination is made in step 152 and the routine proceeds to step 168. All the wheels of the vehicle are then locked by the locking plate 64 thus completing the non-reference wheel alignment measurement process.

Note that, after the operator has adjusted the toe angle of each non-reference wheel of the vehicle 20, if there is a need to check the toe angle again, an instruction is given to perform the above non-reference wheel alignment measurement process again. A determination is then again made, in the same way as above, as to whether or not the wheel alignment after the toe angle adjustment is suitable on the basis of the differences in the wave forms of the lateral forces Fy of the reference wheel and the non-reference wheel. Thus, regardless of the type of tire fitted to the vehicle 20, the alignment (wheel angle) of each wheel of the vehicle 20 is appropriately adjusted such that a high level of running stability appropriate for an actual road surface in accordance with the characteristics of the tire, as well as improved one-sided wear, can be obtained, at the same time, the steering characteristics of the vehicle to be at substantially neutral steer.

More over, because a combination of the tire driving apparatus 18, the main lifting apparatus 10 for lifting the vehicle 20 levelly, and a sub-lifting apparatus 14 for lifting only the body of the vehicle 20 was employed for the wheel alignment measuring apparatus, the apparatus can also easily be used for changing tires or for vehicle maintenance.

Note too that, in the above, the difference in the wave forms was obtained by comparing the wave forms of the lateral forces of the reference wheel and the non-reference wheel, however, the present invention is not limited to this. The difference in the wave forms may also be obtained by comparing the wave forms of the rate of change in the lateral force (the primary differential values (dFy/dt)) and then calculating the direction and the like of the toe angle adjustment.

In the above explanation, the rear axle of the vehicle was used as the reference axle, the rear wheels as the reference wheels and the front wheels as the non-reference wheels (the wheels to be adjusted of the present invention), however, the present invention is not limited to this. The front axle may be set as the reference axle, the front wheels as the reference wheels, and the rear wheels as the non-reference wheels or they may be switched depending on the type of vehicle and the like.

In the above explanation, a comparison was made between the wave forms of the lateral force Fy of a non-reference wheel and the reference wheel mounted on the vehicle diagonally opposite to the non-reference wheel (for example, a left rear wheel and a right front wheel, or a right wheel and a left front wheel), however, the present invention is not limited to this. A comparison may be made between the wave forms of the lateral forces of a reference wheel and a non-reference wheel both mounted on the same side in the lateral direction of the vehicle (for example, a left front wheel and a left rear wheel or a right front wheel and a right rear wheel).

Further, in the above explanation, the predetermined period was determined on the basis of the transition of the rate of change in the longitudinal force Fx (primary differential value of the longitudinal force dFx/dt) after measuring the longitudinal force Fx and the lateral force Fy, however, the present invention is not limited to this. As is clear from comparing FIGS. 2 and 3, the rate of change in the load Fz when the wheel travels in sequence over the upward step and the downward step (primary differential values of the load dFz/dt) change in the same way as the rate of change in the longitudinal force Fx (however, the positivity or negativity are reversed). Therefore, it is possible to provide, for example, a force sensor with a structure capable of measuring the force in the direction of the axis of rotation of the endless track 34 (the lateral force Fy) and the force orthogonal to the direction of the axis of rotation of the endless belt (the load Fz), and to determine the predetermined period on the basis of the transition of the rate of change of the load Fz after measuring the load Fz instead of the longitudinal force Fx.

Further, the explanation given above is for when a force sensor for detecting force in two directions (longitudinal force Fx or load Fz, and lateral force Fy) is used, however, the present invention is not limited to this. When the period for calculating the energy of the variation in the lateral force Fy (the predetermined period) is to be determined on the basis of, for example, the longitudinal force Fx and the load Fz, it is possible to provide a force sensor with a structure capable of measuring force in three directions (longitudinal force Fx, lateral force Fy, and load Fz) and using this force sensor to measure the longitudinal force Fx, lateral force Fy, and load Fz.

Figure 3:
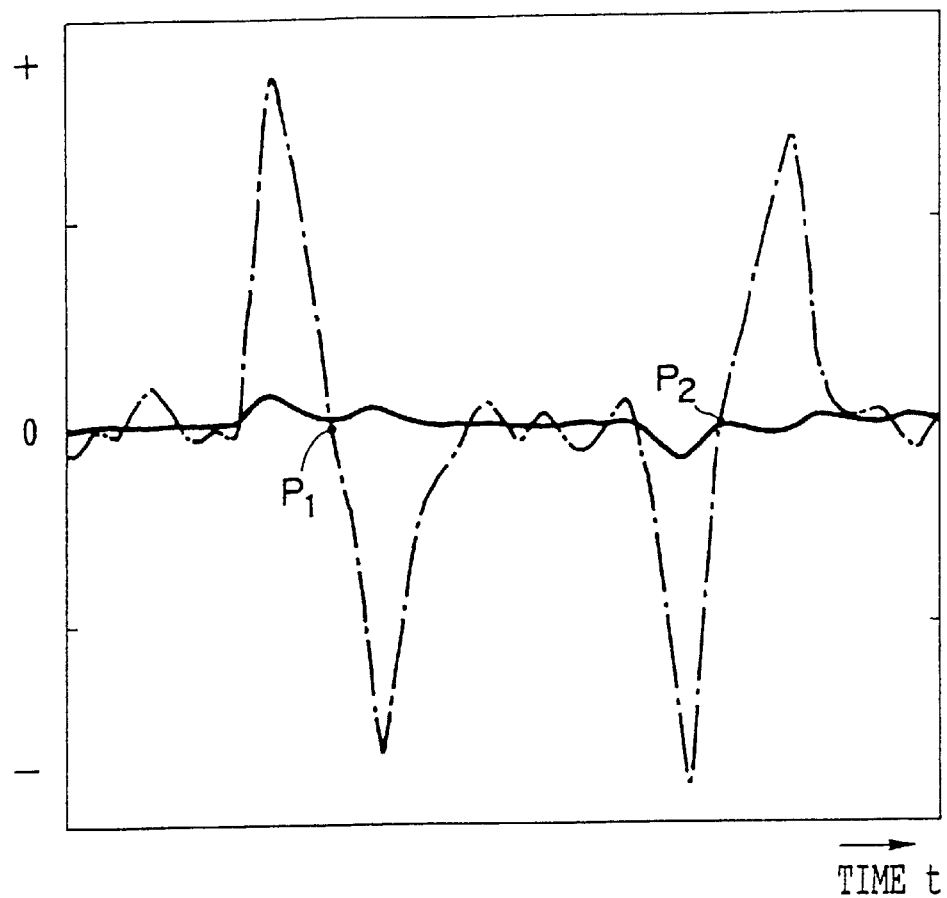
FIG. 3 is a line graph showing examples of the transition of the primary differential value of the load generated in the tire when the wheel travels over the upward step and then the downward step and the transition of the primary differential value of the lateral force generated in the tire when the wheel travels over the upward step and then the downward step.

Moreover, the explanation given above is for when, on the basis of the transition of the rate of change in the longitudinal force (or load), the first timing, which is when the rate of the change (the primary differential value) of the longitudinal force or load caused by the tire deforming as the wheel climbs up onto a protrusion returns to the minimum after changing to a predetermined value or more (the timing indicated by $P_1$ in FIGS. 2 and 3), and the second timing, which is when the rate of the change in the longitudinal force or the load caused by the tire on a wheel deforming as the wheel descends from the protrusion returns to the minimum after changing to a predetermined value or more (the timing indicated by $P_2$ in FIGS. 2 and 3) are determined and the energy of the variation in the lateral force is calculated within the predetermined period from the first timing until the second timing, however, the predetermined period according to the second aspect of the present invention may include the time from when the tire is deformed until the tire returns substantially to its normal state, and the second timing of the predetermined period may be determined as being the time when, for example, the front edge portion of the road-contacting surface of the tire is no longer in contact with the protruding surface (i.e. the timing corresponding to the peak of the portion of the primary differential value of the longitudinal force or lateral force being above a predetermined value immediately before the point $P_2$ in FIGS. 2 and 3), and the energy of the change in the lateral force calculated for this period.

In addition, according to the present invention, it is sufficient if at least the energy of the variation in the lateral force during the period from when the tire is deformed by the wheel travelling over the step (preferably, the upward step) until the tire rotates and returns substantially to its normal state. Because of this, instead of measuring the longitudinal force Fx or the load Fz, it is possible to detect the timing when the wheel travels over the step by detecting the displacement of the tire in, for example, the vertical direction and, on the basis of the time lapsed from that timing, to determine the timing when the tire rotates and returns substantially to its normal state.

Figure 16:
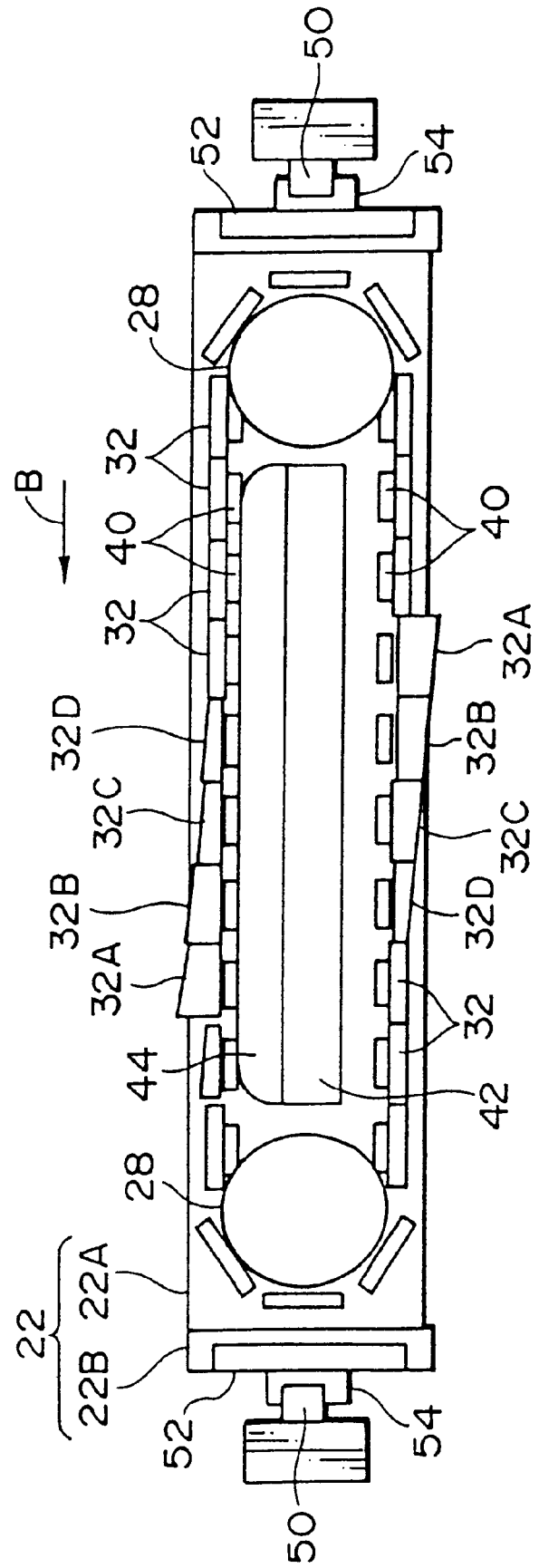
FIG. 16 is a schematic cross-sectional diagram showing another example of a tire driving apparatus.
Figure 17A:
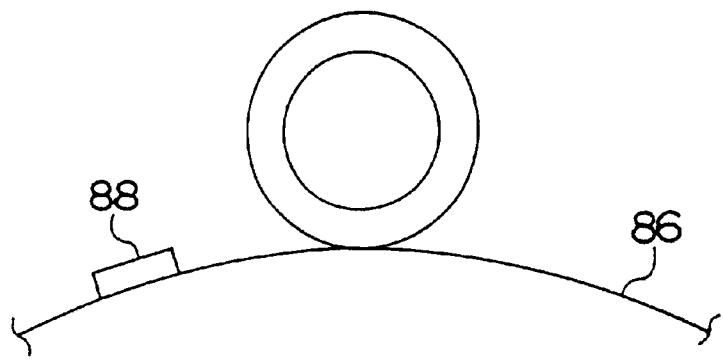
FIGS. 17A through 17C are schematic diagrams of further examples of tire driving apparatuses.
Figure 17B:
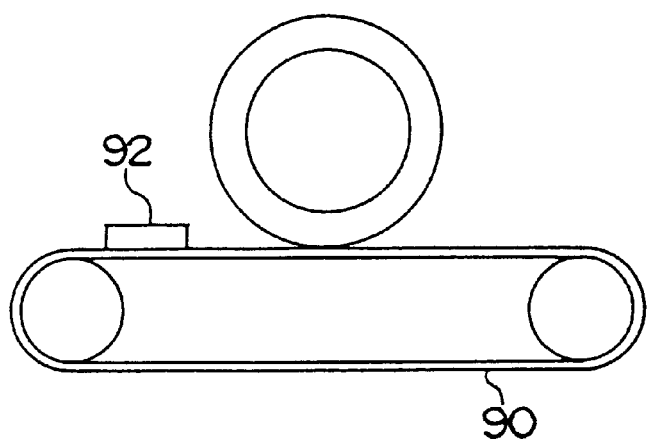
Figure 17C:
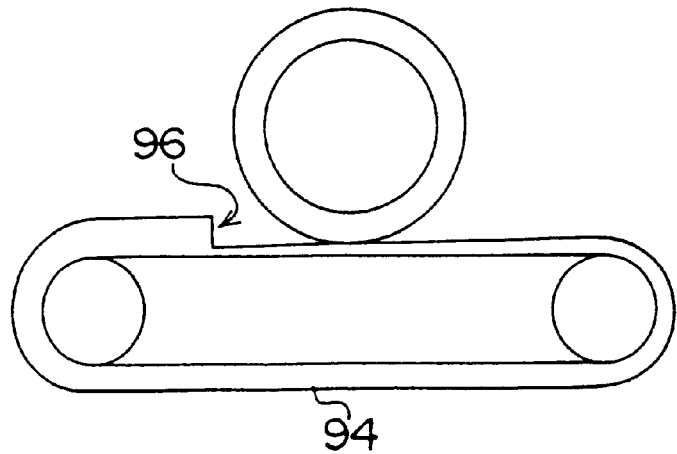
Figure 18:
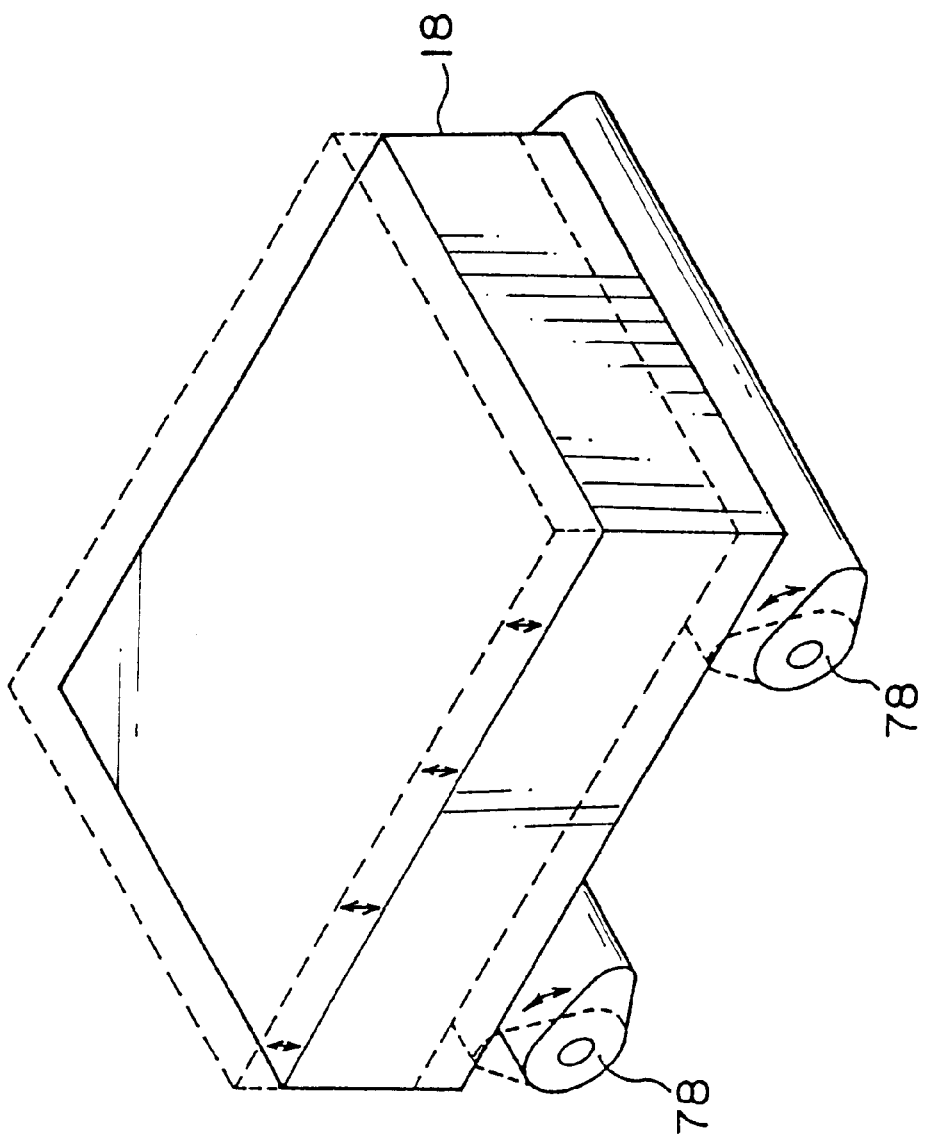
FIG. 18 is a perspective view showing an example of a mechanism for moving a tire driving apparatus in a vertical direction.

The explanation given above was also for an example in which an upward step and a downward step are formed on a tire driving surface by providing a protrusion 38 on plate sections 32 forming the above-described tire driving surface, however, the present invention is not limited to this, and the step may be formed on the tire driving surface by, for example, altering the thickness of a portion of the plate sections 32, as is shown in FIG. 16. In the tire driving apparatus shown in FIG. 16, when looking from the direction in which the wheel rotates on the tire driving surface (the opposite direction to the direction in which the endless track 34 rotates, i.e. the opposite direction to that indicated by the arrow B in FIG. 16), four plate sections 32A~32D are formed and arranged continuously in the direction of rotation in such a way that the height of the tire driving surface is suddenly raised up and then gradually returns to the original height. A step is formed between the normal plate sections 32 which are positioned downstream from the plate section 32A in the direction in which the endless track rotates and the plate section 32A. In this case, the wheel rotating on the tire driving surface travels over the upward step only, however, because the change in the energy of the variation in the lateral force due to the wheel angle is larger when the wheel travels over the upwards step, so that even if a tire driving apparatus having the structure shown in FIG. 16 is used, the alignment of the wheel can be accurately adjusted to the appropriate wheel angle.

In the example given in the above explanation, a motor was mounted to the outside of the tire driving apparatus, however, a built-in type roller may also be used having the motor fitted inside the driving roller.

Figure 14:
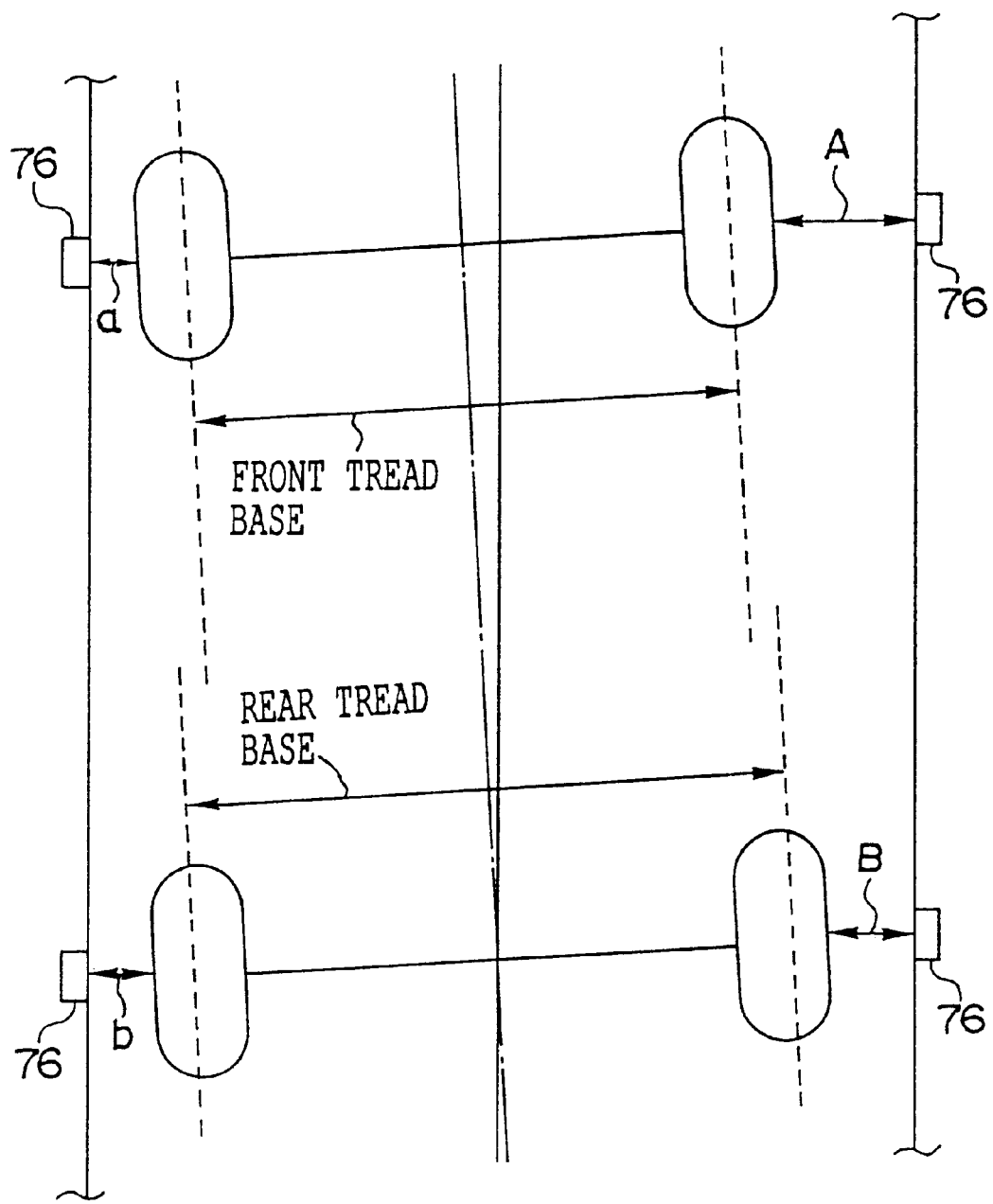
FIG. 14 is an explanatory diagram showing how the vehicle orientation is adjusted.

The example given in the above explanation also described an endless track 34 having a driving surface which was formed from connected plate sections 32, however, the present invention is not limited to this, and several other structures may be used. For example, as is shown in FIG. 15A, the outer surface of a large-scale roller 86 may be used as the tire driving surface and planar-like protrusion 88 is mounted on the outer surface of the roller 86 so as to form a step, or, as is shown in FIG. 15B, the outer surface of an endless belt 90 may be used as the tire driving surface, and planar protrusions 92 attached to the outer surface of the endless belt 90. Alternatively, as is shown in FIG. 15C, an endless belt 94 may be formed having a thickness which steadily increases or decreases at a substantially constant rate of change in the circumferential direction and having a portion at a predetermined position in the circumferential direction on the outer surface where the thickness abruptly changes, so that, in the same way as in the tire driving apparatus in FIG. 14, the tire driving surface and the step 96 (i.e. the portion where the thickness abruptly changes) are formed integrately together. Note that the present invention is not limited to the number or shape of protrusion or step described in the above examples, and these may be suitably varied provided that the operations and effects of the present invention are not hindered.

In the above explanation, a vehicle and a tire driving surface were rotated relative to each other by rotating the tire driving surface (the wheel rotating surface) and the wheel being rotated on the tire driving surface, however, the present invention is not limited to this, and the following method may be used. At least one protrusion is mounted on a road surface so as to form the wheel rotating surface. Sensors for detecting the longitudinal force, or the load, and the lateral force generated in a tire are attached to the vehicle and the car is driven so that the wheels travel over the protrusion mounted in the road. The wheel angle is then adjusted on the basis of the results of the measurements of the longitudinal force, or the load, and the lateral force by the sensors attached to the vehicle. Moreover, instead of mounting protrusions on the road surface, it is possible to form a wheel rotating surface by providing rectangular, plain-bottomed grooves in the road surface. In this case, if the size of the opening of the grooves is of a sufficient length for the wheel to be able to rotate on the bottom of the groove, then the edge of the groove acts as a step allowing adjustment of the wheel angle to be performed in the same way as when the protrusion are mounted on the road surface. The first and second aspects of the present invention include the above embodiments within the scope of their aspects.

In the above explanation, the tire was deformed by rotating the wheel on a wheel rotating surface having a step formed thereon, and then measuring the lateral force generated in the tire, however, the present invention is not limited to this. In a vehicle having equal or more than four wheels, by changing the position of one wheel in substantially a vertical direction relative to the other wheels, the load acting on each wheel of the vehicle changes and a deformation is caused in the tire. Therefore, for example, by the wheel to be measured being displacement in substantially the vertical direction so as to change the load acting on the wheel being measured, the tire on the wheel being measured is deformed without using a step and the lateral force and load generated in the tire may be measured.

Making displacement the tire in substantially the vertical direction can be achieved, as is shown in FIG. 16, by providing a structure in which cams 78 are provided beneath the tire driving apparatus 18 so as to be in contact with the tire driving apparatus 18, and the tire driving apparatus 18 is supported by the cams 78, and then the cams 78 are rotated so that the tire driving apparatus 18 is moved up and down. In the above structure, when the cams 78 are rotated to the position shown by the dotted lines in FIG. 16, the wheels are displaced upwards in substantially the vertical direction via the tire driving apparatus 18, thus deforming the tire. However, in order to accurately measure the variation in the lateral force (and load) generated in the tire, it is necessary to rotate the cams within a comparatively short time to cause the load acting on the wheel to change a predetermined amount or more within a predetermined time. Moreover, in this case, because there is hardly any change in the longitudinal force, it is also possible to measure the load generated in the tire for a certain period including the timing when the cam is rotated and a period before and after that timing, and the results of the measurement of the load are compared to the load generated in the tire when the tire is in substantially a normal state (the load reference value). The period when a difference between the reference value and the measured value exists is determined as the predetermined period in the second aspect of the present invention. The first and second aspects of the present invention includes the above described aspect.

Moreover, the sum E of the square root of the rate of change in the lateral force Fy within a predetermined period (the primary differential value dFy/dt) is obtained as the energy of the variation in the lateral force within a predetermined period at adjusting the wheel angle of the wheel to be adjusted described above, however, the present invention is not limited to this. For example, as the energy of the variation in the lateral force: the summation of the absolute value of the primary differential value of the lateral force Fy within the predetermined period ($=\Sigma|dFy/dt|$); the summation of the secondary differential value of the lateral force Fy within the predetermined period ($=\Sigma d^2Fy/dt^2$); the summation of the square root of the secondary differential value of the lateral force Fy within the predetermined period ($=\Sigma (d^2Fy/dt^2)^2$); the summation of the absolute value of the secondary differential value of the lateral force Fy within the predetermined period ($=\Sigma|d^2Fy/dt^2|$); the summation of the tertiary differential value of the lateral force Fy within the predetermined period ($=\Sigma d^3Fy/dt^3$); the summation of the square root of the tertiary differential value of the lateral force Fy within the predetermined period ($=\Sigma (d^3Fy/dt^3)^2$) and the like may be obtained, and an arbitrary physical amount corresponding to the energy of the variation in the lateral force can be used.

In the explanation given above, the toe angle was adjusted for each wheel by an operator on the basis of the direction of toe angle adjustment displayed on the display unit 82, however, the present invention is not limited to this. Generally, the steering wheel of a vehicle is structured so that the toe angle can be adjusted, however, there are also vehicles which are not structured so that the toe angle can be adjusted for each wheel other than the steering wheel, and there are also vehicles which are structured so not only that the toe angle cannot be adjusted for each wheel other than the steering wheel, but also that the toe angle cannot be adjusted for the wheels per each of axle. In cases such as this, it is possible to adjust the angle between the axle and the vehicle body on the basis of the information displayed on the display unit 82 so that the energy of the variation in the lateral force generated in a tire within a predetermined period according to the present invention is made substantially equal for each of pair of wheels mounted on the axle.

The main lifting apparatus 10 and the sub-lifting apparatus 14 of the wheel alignment measuring apparatus may also have an integrated structure. Moreover, the wheel alignment measuring apparatus may be structured having a tire driving apparatus 18 mounted on a turning apparatus which is capable of turning around a vertical axis and which is capable of displaying the turning angle or outputting the turning angle as a signal. In this case, by repeating in sequence a process of rotating the wheel using the tire driving apparatus 18 and collecting the data, and a process of turning the turning apparatus (this action equates to changing the toe angle of the wheel), it becomes possible, on the basis of the collected data, to achieve an optimum toe angle value regardless of the direction in which the toe angle is to be adjusted.

If the vehicle to be adjusted is capable of having the camber angle thereof which is able to be adjusted, it is possible to adjust the camber angle within the range permitted by the design specifications. When the camber angle is adjusted, it is preferable if a conventionally known alignment measuring apparatus or an angle measuring device such as an angle meter is used in combination with the above-described wheel alignment measuring apparatus, as the work efficiency is thereby improved.

The explanation above was for an example in which two pairs of tire driving surfaces were used, however, it is possible to use one pair of tire driving surfaces and adjust only the alignment of the steering wheel or adjust the alignment for each of the front and rear axles.

The embodiment of the present invention has been described above, however, the above-described embodiment is not limited to the aspects described in the claims and includes the methods described below.

(1) A method of adjusting a wheel alignment of a vehicle according to the first or the second aspects of the present invention, wherein the wheel rotating surface is an outer peripheral surface of an endless track which is driven to rotate, the wheel of the vehicle to be adjusted is placed on the wheel rotating surface and the endless track is driven to rotate so that the wheel of the vehicle to be adjusted is rotated, thereby moving the vehicle and the wheel rotating surface relatively.

(2) A method of adjusting a wheel alignment of a vehicle according to the second aspect of the present invention, wherein the wheel rotating surface is a substantially planar surface, the wheel rotates on the wheel rotating surface, and the load acting on the wheel is changed by displacing the wheel in substantially a vertical direction via the wheel rotating surface, the load and the lateral force generated in the tire of the wheel are each measured, and the predetermined period is determined by comparing the result of the measurement of the load with a load generated in the tire when the tire of the wheel is substantially normal state.

(3) A method of adjusting a wheel alignment of a vehicle according to the third aspect of the present invention, wherein a plurality of measurements are made of the lateral force in a period for measuring the lateral force, and the energy of the variation in the lateral force generated in the tire of the reference wheel within the predetermined period is determined by calculating and adding of, on the basis of the lateral force measured at each measurement within the predetermined period, at least one of the square root of the primary differential value of the lateral force at each measurement, or the absolute value of the primary differential value of the lateral force at each measurement, or the secondary differential value of the lateral force, or the square root of the secondary differential value of the lateral force, or the absolute value of the secondary differential value of the lateral force, or the tertiary differential value of the lateral force, or the square root of the tertiary differential value of the lateral force.

What is claimed is:

1. A method of adjusting a wheel alignment of a vehicle, in which a wheel of the vehicle to be adjusted with a tire fitted thereto is rotated on a wheel rotating surface in a proceeding direction of the vehicle, one of the wheel being made to pass over a step of a predetermined height formed on the wheel rotating surface or a load acting on the wheel being changed by a predetermined amount within a predetermined period, and a lateral force generated in the tire fitted to the wheel is measured, is performed for a reference wheel having the tire fitted thereto which is mounted on a reference axle of the vehicle, and for a wheel having a tire fitted thereto to be adjusted which is mounted on a non-reference axle of the vehicle, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted, and a wheel angle of the wheel to be adjusted is adjusted on the basis of the result of the comparison.

2. A method of adjusting a wheel alignment of a vehicle, in which a wheel of the vehicle to be adjusted with a tire fitted thereto is rotated on a wheel rotating surface in a proceeding direction of the vehicle, one of the wheel being made to pass over a step of a predetermined height formed on the wheel rotating surface or a load acting on the wheel being changed by a predetermined amount within a predetermined period is performed, and one of a longitudinal force or a load, and a lateral force generated in the tire fitted to the wheel are each measured, is performed for a reference wheel having the tire fitted thereto which is mounted on a reference axle of the vehicle, and for a wheel having a tire fitted thereto to be adjusted which is mounted on a non-reference axle of the vehicle, a predetermined period including a time from when the tire of the wheel is deformed when one of the wheel passing over a step or the load acting on the wheel being changed occurs until the tire rotates and returns substantially to normal state is determined for the reference wheel and for the wheel to be adjusted on the basis of the result of the measurement of one of the longitudinal force or the load, a comparison is made between a transition of one of the lateral force or a rate of change in the lateral force generated in the tire fitted to the reference wheel and a transition of one of the lateral force or the rate of change in the lateral force generated in the tire fitted to the wheel to be adjusted within the predetermined period, and a wheel angle of the wheel to be adjusted is adjusted on the basis of the result of the comparison.

3. The method of adjusting the wheel alignment of a vehicle according to claim 1, wherein the reference wheel is rotated on a wheel rotating surface in the proceeding direction of the vehicle, one of the reference wheel being made to pass over the step of the predetermined height formed on the wheel rotating surface or the load acting on the reference wheel being changed by the predetermined amount in the predetermined period is performed, and the lateral force generated in the tire fitted to the reference wheel is measured; and the wheel angle of the reference wheel is adjusted in advance so that an energy of a variation in the lateral force generated in the tire within the predetermined period, which includes the time from when the tire of the reference wheel is deformed when one of the reference wheel passing over the step or the load acting on the reference wheel being changed occurs until the tire rotates and returns to substantially normal state, is within a predetermined range which includes the minimum value of the energy of the vibration.

4. The method of adjusting the wheel alignment of a vehicle according to claim 2, wherein the reference wheel is rotated on a wheel rotating surface in the proceeding direction of the vehicle, one of the reference wheel being made to pass over the step of the predetermined height formed on the wheel rotating surface or that the load acting on the reference wheel being changed by the predetermined amount in the predetermined period is performed, and the lateral force generated in the tire fitted to the reference wheel is measured; and the wheel angle of the reference wheel is adjusted in advance so that an energy of a variation in the lateral force generated in the tire within the predetermined period, which includes the time from when the tire of the reference wheel is deformed when one of the reference wheel passing over the step or the load acting on the reference wheel being changed occurs until the tire rotates and returns to substantially normal state, is within a predetermined range which includes the minimum value of the energy of the vibration.

5. The method of adjusting the wheel alignment of a vehicle according to claim 1, wherein the reference wheel and the wheel to be adjusted whose transitions of one of the lateral force or the rate of change in the lateral force are compared are wheels mounted on the vehicle at positions diagonally opposite to each other.

6. The method of adjusting the wheel alignment of a vehicle according to claim 2, wherein the reference wheel and the wheel to be adjusted whose transitions of one of the lateral force or the rate of change in the lateral force are compared are wheels mounted on the vehicle at positions diagonally opposite to each other.

7. The method of adjusting the wheel alignment of a vehicle according to claim 2, wherein the step is formed on the wheel rotating surface by providing on the wheel rotating surface a substantially plate-shaped protrusion whose top surface is a predetermined height above a base surface of the wheel rotating surface, and the protrusion is formed so that the protruding surface extends long enough in a direction of a relative movement of the vehicle and the wheel rotating surface for both ends of a ground-contacting portion of the tire in the direction of the relative movement to be in contact with the protruding surface when the wheel passes over the protrusion, and the predetermined period is determined to be a period from a first timing until a second timing, the first timing being when a rate of a change in at least one of the longitudinal force or the load as the wheel climbs up onto the protrusion and the tire of the wheel deforms becomes the minimum after changing to a predetermined value or more, and the second timing being one of when the rate of the change in at least one of the longitudinal force or the load becomes the minimum after changing to a predetermined value or more, or when a front end of the ground-contacting portion of the tire in the direction of the relative movement is without contacting with the protruding surface as the tire rotates on the protruding surface and the wheel descends from the protrusion and the tire of the wheel deforms.

8. The method of adjusting the wheel alignment of a vehicle according to claim 2, wherein a wave form of one of the lateral force or the rate of change in the lateral force generated in the tire of the reference wheel within the predetermined period and a wave form of one of the lateral force or the rate of change in the lateral force generated in the tire of the wheel to be adjusted within the predetermined period are compared to obtain the difference between the two wave forms, and the wheel angle of the wheel to be adjusted is adjusted in such a way that the difference between the two wave forms is reduced.

9. The method of adjusting the wheel alignment of a vehicle according to claim 8, wherein a characteristic point is extracted from the wave form of one of the lateral force or the rate of change in the lateral force generated in the tire of the reference wheel within the predetermined period and a characteristic point is extracted from the wave form of one of the lateral force or the rate of change in the lateral force generated in the tire of the wheel to be adjusted within the predetermined period, and the two wave forms are superposed with the characteristic points superposed as a reference point so as to obtain the difference in the two wave forms.

* * * * *